United States Patent
Ono et al.

(10) Patent No.: US 10,165,412 B2
(45) Date of Patent: Dec. 25, 2018

(54) INFORMATION PROCESSING DEVICE AND INFORMATION PROCESSING METHOD

(71) Applicant: SONY CORPORATION, Tokyo (JP)

(72) Inventors: Hideyuki Ono, Kanagawa (JP); Masanori Katsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/302,771

(22) PCT Filed: Mar. 3, 2015

(86) PCT No.: PCT/JP2015/056207
§ 371 (c)(1),
(2) Date: Oct. 7, 2016

(87) PCT Pub. No.: WO2015/178065
PCT Pub. Date: Nov. 26, 2015

(65) Prior Publication Data
US 2017/0026801 A1    Jan. 26, 2017

(30) Foreign Application Priority Data

May 22, 2014 (JP) .................................. 2014-106144

(51) Int. Cl.
*H04W 4/02* (2018.01)
*G06F 3/14* (2006.01)
(Continued)

(52) U.S. Cl.
CPC .............. *H04W 4/027* (2013.01); *G06F 3/14* (2013.01); *G06N 5/04* (2013.01); *G06N 99/00* (2013.01);
(Continued)

(58) Field of Classification Search
CPC ..... A61B 5/11; A61B 5/10; G06F 3/14; G06F 3/0304; G06F 3/0346; G06F 3/04883;
(Continued)

(56) References Cited

U.S. PATENT DOCUMENTS 9,529,089 B1* 12/2016 Buether .................. G01S 19/49
9,841,286 B1* 12/2017 Hayward ............... G08G 1/166
(Continued)

FOREIGN PATENT DOCUMENTS

JP     2008-152655     7/2008
JP     2012-083323     4/2012
(Continued)

OTHER PUBLICATIONS

Kapil Gupta: Publishing CitiSense Data: Privacy Concerns and Remedies; Mar. 15, 2013, XP55415061.*
(Continued)

*Primary Examiner* — Khawar Iqbal
(74) *Attorney, Agent, or Firm* — Paratus Law Group, PLLC

(57) ABSTRACT

There is provided an information processing device that can improve the precision of the action recognition process by considering the speed information, the information processing device including: an action recognition unit configured to recognize an action of a user based on sensor information; a speed acquisition unit configured to acquire speed information indicating a movement speed of the user; and a correction unit configured to correct an action recognition result based on a comparison result between the speed information and a speed threshold set according to the action recognition result.

10 Claims, 32 Drawing Sheets

(51) Int. Cl.
*G06N 5/04* (2006.01)
*G06N 99/00* (2010.01)
*G06F 3/03* (2006.01)
*G06F 3/0346* (2013.01)
*G06F 3/0488* (2013.01)

(52) U.S. Cl.
CPC .......... *G06F 3/0304* (2013.01); *G06F 3/0346* (2013.01); *G06F 3/04883* (2013.01)

(58) Field of Classification Search
CPC ......... G06N 5/04; G06N 99/00; H04W 4/027; G01S 19/07; G01S 15/00; G01S 19/49; G01P 15/00
See application file for complete search history.

(56) References Cited

U.S. PATENT DOCUMENTS

| | | | | |
|---|---|---|---|---|
| 2008/0275631 | A1* | 11/2008 | Sumizawa | G01C 21/367 701/532 |
| 2011/0294520 | A1 | 12/2011 | Zhou et al. | |
| 2012/0232432 | A1* | 9/2012 | Kahn | A61B 5/1038 600/595 |
| 2014/0267021 | A1* | 9/2014 | Lee | G06F 3/013 345/156 |
| 2014/0277633 | A1* | 9/2014 | Flaction | G01S 19/19 700/91 |
| 2015/0195679 | A1* | 7/2015 | Miyasaka | H04W 4/027 342/357.32 |
| 2015/0369921 | A1* | 12/2015 | Lee | G01S 19/07 701/469 |
| 2016/0320199 | A1* | 11/2016 | Chen | G01C 21/3664 |
| 2017/0010677 | A1* | 1/2017 | Roh | G06F 3/0488 |
| 2017/0092329 | A1* | 3/2017 | Kim | G11B 27/031 |
| 2017/0116964 | A1* | 4/2017 | Needham | G09G 5/003 |
| 2017/0140457 | A1* | 5/2017 | Kaku | G06F 3/017 |
| 2018/0043923 | A1* | 2/2018 | Yamada | B60W 50/10 |

FOREIGN PATENT DOCUMENTS

| | | | | |
|---|---|---|---|---|
| JP | 2012083323 | * | 4/2012 | ............ G01C 21/28 |
| JP | 2013-003649 | | 1/2013 | |

OTHER PUBLICATIONS

Oct. 23, 2017, European Search Report Issued for related EP application No. 15796885.0.

Furletti, et al., Inferring Human Activities from GPS Tracks, UrbComp 2013, Aug. 11, 2013, pp. 1-7, Chicago, USA.

Gupta, Publishing CitiSense Data: Privacy Concerns and Remedies, Master's Project Report, Mar. 15, 2013, pp. 1-16, San Diego, USA.

Aug. 29, 2018, EP Communication issued for related EP Application No. 15796885.0.

Wang et al., Foreground Object Detection by Motion-based Grouping of Object Parts, International Journal of Intelligent Transportation Systems Research, Jan. 30, 2014, pp. 70-82.

* cited by examiner

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2015/056207 (filed on Mar. 3, 2015) under 35 U.S.C. § 371, which claims priority to Japanese Patent Application No. 2014-106144 (filed on May 22, 2014), which are all hereby incorporated by reference in their entirety.

TECHNICAL FIELD

The present disclosure relates to an information processing device and an information processing method.

BACKGROUND ART

Technology which recognizes operation actions of a user from sensor information acquired using various sensing technologies has been proposed. The recognized operation actions of the user are automatically recorded as an action log, and based on this action log, it can be expressed with various techniques, such as reproduction with an animation such as an avatar, showing a movement locus of the user on a map, or expressing various action operations using abstracted indicators.

For example, various techniques of generating an action log using a recording device containing a small sensor, such as a smartphone, and presenting the action log to a user are proposed in Patent Literature 1. In the techniques, operation action data indicating an operation action of the user is analyzed based on sensor information and an action segment expressed by semantic content of the operation action is generated from the operation action data. By expressing the action log by the action segment expressing the semantic content of the operation action, it is possible to present information to the user so that the user can easily understand the information.

CITATION LIST

Patent Literature

Patent Literature 1: JP 2013-3649A

SUMMARY OF INVENTION

Technical Problem

However, depending on precision of an action recognition process, there may be an error in an action log presented to the user. In particular, since precision of speed information has a considerable influence on action recognition related to a moving unit, it is considered possible to improve the precision of the action recognition process by considering the speed information.

Solution to Problem

According to the present disclosure, there is provided an information processing device including: an action recognition unit configured to recognize an action of a user based on sensor information; a speed acquisition unit configured to acquire speed information indicating a movement speed of the user, and a correction unit configured to correct an action recognition result based on a comparison result between the speed information and a speed threshold set according to the action recognition result.

According to the present disclosure, there is provided an information processing method including: recognizing an action of a user based on sensor information; acquiring speed information indicating a movement speed of the user; and correcting an action recognition result based on a comparison result between the speed information and a speed threshold set according to the action recognition result.

According to the present disclosure, by determining a probability of the action recognition result based on the speed information, it is possible to improve precision of the action recognition result.

Advantageous Effects of Invention

According to the present disclosure, as described above, it is possible to improve precision of the action recognition process by considering the speed information. Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
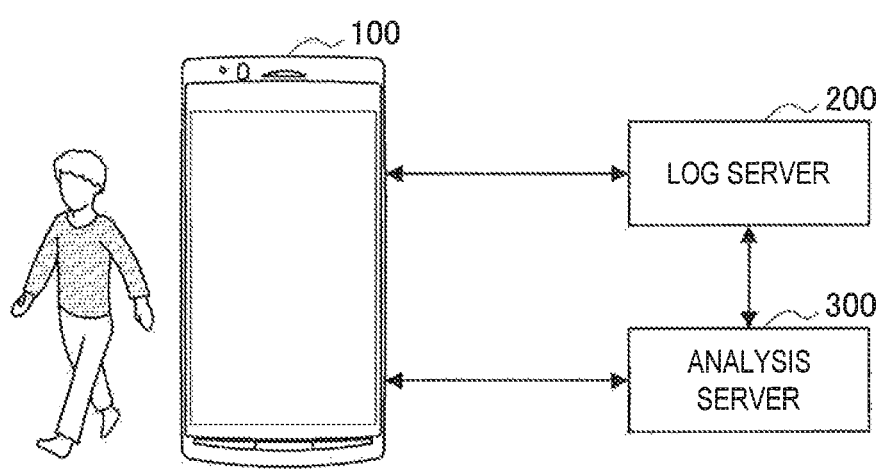
FIG. 1 is an explanatory diagram illustrating a schematic configuration of an action log display system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be made in the following order.
1. Overview of action log display system
2. Configuration of system
2.1. Client terminal
2.2. Log server
2.3. Analysis server
3. Action log display process
3.1. Process related to acquisition of sensor information
3.2 Action recognition process
(1) Overview of action recognition process
(2) Filter process on positional information
(a. Functional configuration)
(b. Process by speed acquisition unit)
(c. Process by vehicle determination unit)
3.3. Action log presentation process
3.4. Action log correction process by user
3.5. Personalization learning process based on correction information
(1) Overview
(2) Functional configuration
(3) Action recognition result decision process considering personalized model
(4) Filter process related to feedback of correction information
4. Conclusion
5. Example of hardware configuration

1. OVERVIEW OF ACTION LOG DISPLAY SYSTEM

Figure 2:
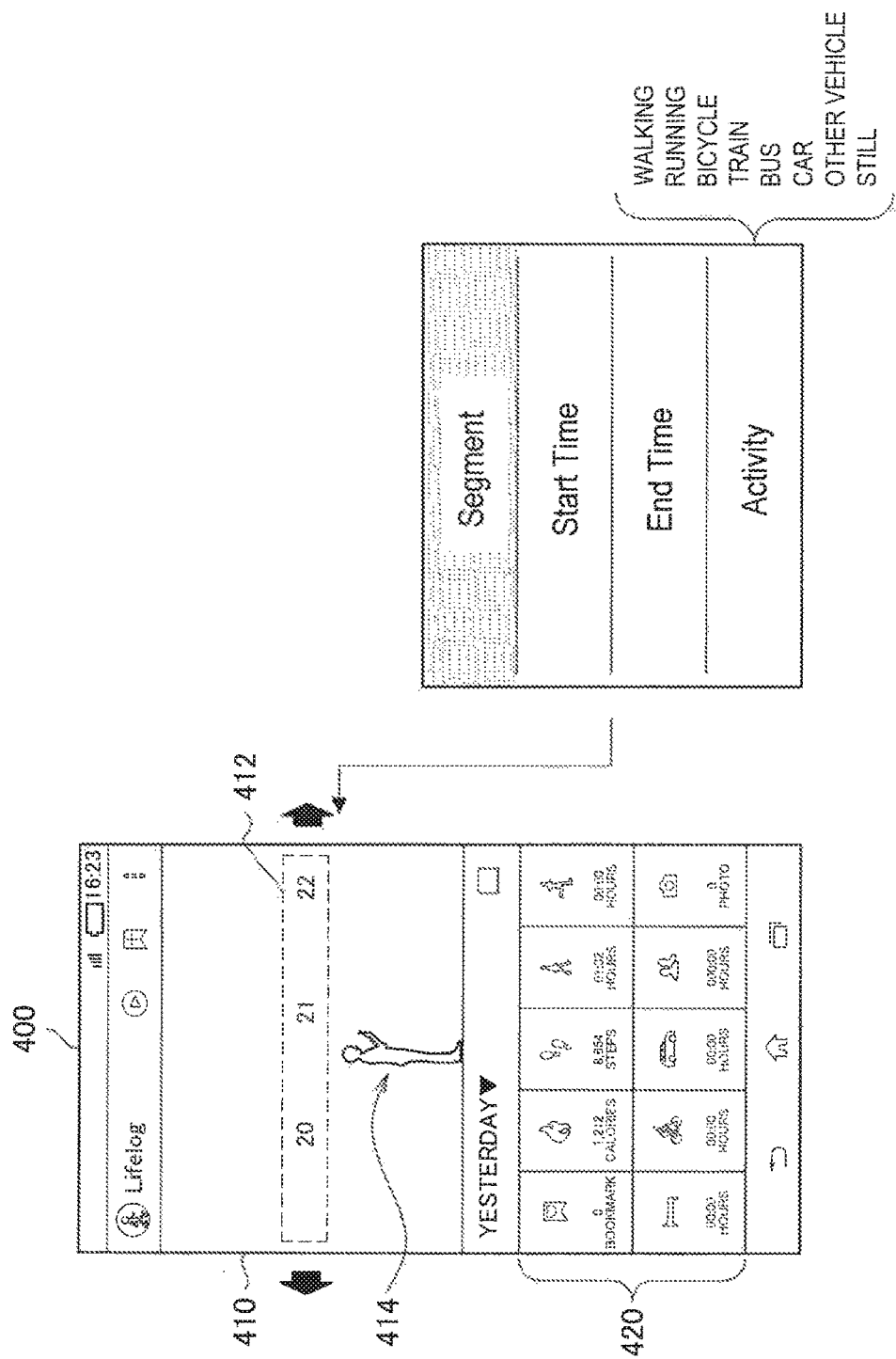
FIG. 2 is an explanatory diagram illustrating a display example of an action log according to the embodiment.

First, an overview of an action log display system according to an embodiment of the present disclosure will be described with reference to FIGS. 1 and 2. FIG. 1 is an explanatory diagram illustrating a schematic configuration of the action log display system according to the embodiment. FIG. 2 is an explanatory diagram illustrating a display example of an action log.

The action log display system according to the embodiment is a system that analyzes actions of a user through an action recognition process based on information regarding the action of the user and presents an analysis result to the user. In the action log system according to the embodiment, as illustrated in FIG. 1, a client terminal 100, a log server 200, and an analysis server 300 are connected via a network to be capable of communicating.

The client terminal 100 acquires information regarding the actions of the user and presents an action log acquired through action recognition to the user. The client terminal 100 is, for example, an information communication terminal such as a smartphone. The client terminal 100 has, for example, an information acquisition function of an acceleration sensor, the GPS, an imaging device, a gyro sensor, or the like in order to collect information regarding the actions of the user. The client terminal 100 includes a display unit that presents the action log to the user and an input unit that inputs correction information to correct the action log.

The client terminal 100 may be constructed of a plurality of different terminals as in a log collection terminal that collects information regarding the actions of the user and a browse terminal that presents the action log to the user. As the log collection terminal, not only the above-described information communication terminal such as a smartphone but also a wearable device of a pendant type, a wristband type, or the like can be used. As the browse terminal, not only the above-described information communication terminal such as a smartphone but also a personal computer, a tablet terminal, or the like can be used.

The client terminal 100 transmits measurement data acquired by various centers as sensor information to the log server 200 at a predetermined timing. In this way, the sensor information which is used to recognize actions of each user is accumulated in the log server 200.

The analysis server 300 calculates an action log representing content of actions of a user through an action recognition process based on the sensor information stored in the log server 200. In the action log, for example, actions such as "eating," "moving," and "sleeping" are recorded along with an action time or positional information. In the action log display system according to the embodiment, the analysis server 300 further analyzes the action log representing content of the actions to recognize the meanings of the actions and generates information (an action segment) to which the meanings of the actions are added. The action segment is unit information in which the action log is expressed so that the user can easily understand the action log. The action log is not simply presented to the user by the action segment, but the action log can be presented so that the user can understand the meanings of the actions.

The action log analyzed by the analysis server 300 and presented to the user is presented to the user through the client terminal 100. FIG. 2 illustrates an example of an action log display screen 400 displayed on a display unit of the client terminal 100. As illustrated in FIG. 2, the action log display screen 400 is formed of, for example, an action display region 410 in which an action recognition result object 414 representing content of an action recognition result is displayed and a summary region 420 which indicates an overview of actions during a predetermined period (for example, one day).

In the action display region 410, a time axis 412 is set in the horizontal direction of a screen and the action recognition result object 414 is displayed to correspond to a time position of the time axis 412 at which an action is performed. In FIG. 2, the action recognition result object 414 represents that a user is walking past 20:30. When the action display region 410 is touched to scroll the screen in the horizontal direction, the time position displayed in the action display region 410 is changed. As the time position displayed in the action display region 410 is changed, display of the action recognition result object 414 displayed in the action display region 410 is also changed to an action recognition result at the time position.

The display of the action recognition result object 414 is changed at each action segment. The action segment is represented by a start time and an end time of an action and action content. Examples of the action content include "walking," "running," "moving by bicycle," "moving by train," "moving by bus," "moving by car," "moving by another vehicle," and "still."

In the summary region 420, the number of pieces of data such as action times of "walking," "running," "moving by bicycle," "moving by car," "sleeping," and the like, the number of steps, calories consumed in the actions, photos, and bookmarks are displayed. When an object of the summary region 420 is selected, detailed content is displayed on the screen.

Here, the content of the action log presented to the user is erroneous in some cases and action content that is more detailed than the presented action content is desired to be presented in some cases. Accordingly, in the action log display system according to the embodiment, a determination process is executed so that the content of the action log presented to the user is more correct, and the action log is further corrected by the user, which is reflected in a subsequent action recognition process. Thus, it is possible to present the action log with the correct content to the user according to an intention of the user. Hereinafter, the configuration and function of the action log display system according to the embodiment will be described in detail.

2. CONFIGURATION OF SYSTEM

Figure 3:
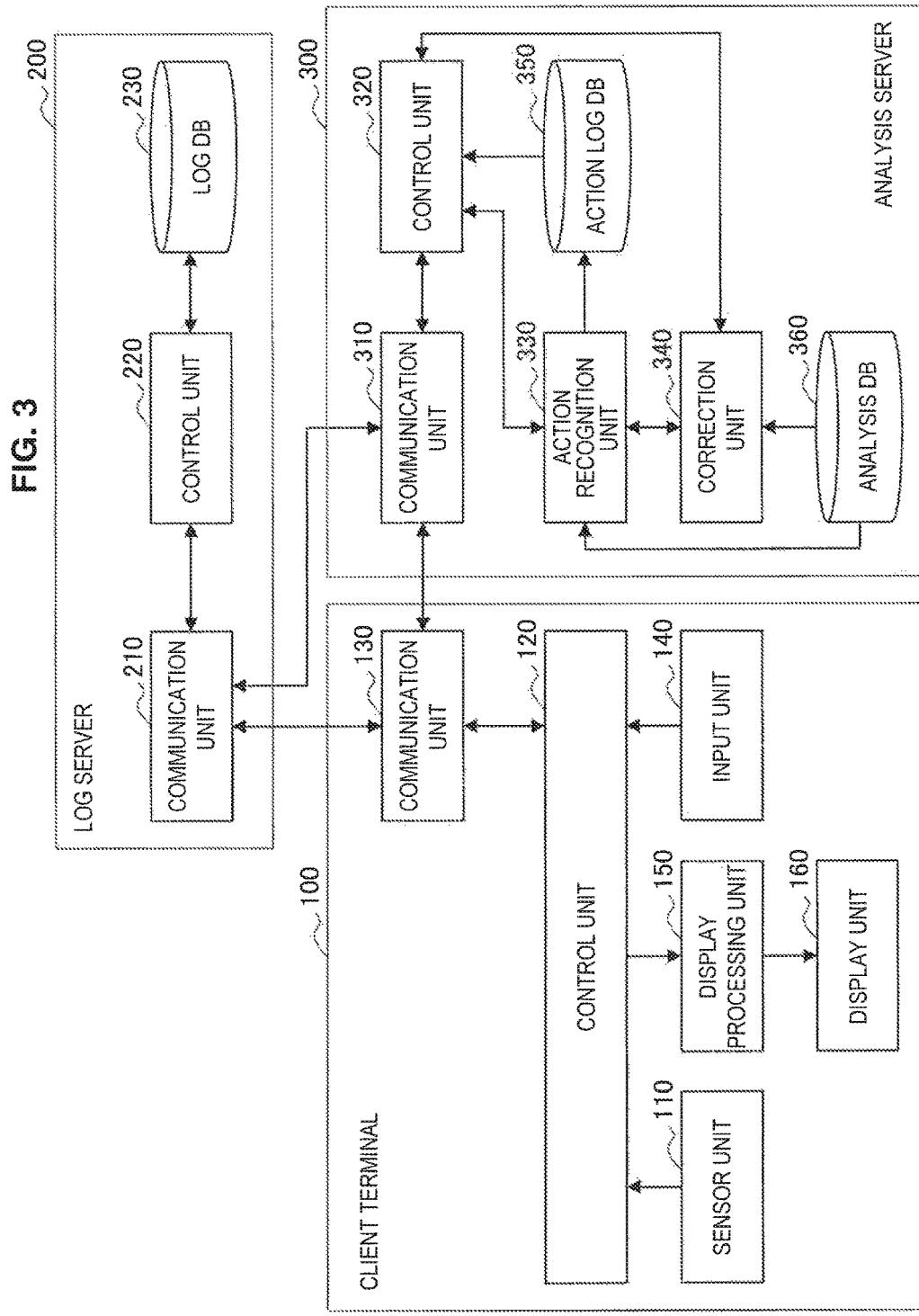
FIG. 3 is a block diagram illustrating a functional configuration of the action log display system according to the embodiment.

FIG. 3 is a diagram illustrating a functional configuration of the action log display system according to the embodiment. The action log display system includes the client terminal 100, the log server 200, and the analysis server 300, as described above.

[2.1. Client Terminal]

The client terminal 100 includes a sensor unit 110, a control unit 120, a communication unit 130, an input unit 140, a display processing unit 150, and a display unit 160.

The sensor unit 110 is a detection unit that acquires motion information regarding actions of the user, such as a position, a motion, or the like of the user. Examples of the sensor unit 110 include an acceleration sensor, a gyro sensor, an imager, and other sensors, and thus measurement data such as acceleration, an angular velocity, imaging data, audio data, or biological information is acquired. The measurement data acquired by the sensor unit 110 is output to the control unit 120 to be transmitted to the log server 200 via the communication unit 130.

The control unit 120 is a functional unit that controls an overall function of the client terminal 100. For example, the control unit 120 transmits the measurement data acquired by the sensor unit 110 to the communication unit 130 in association with user information including a user ID for specifying the user. The control unit 120 receives a manipulation input from the user and controls the client terminal 100 such that a function according to content of the manipulation input is executed. Further, when display information such as an action log is acquired, the control unit 120 controls the client terminal 100 so that the display information is displayed on the display unit 160.

The communication unit 130 is a functional unit that transmits and receives information to and from a server or the like connected via a network. The communication unit 130 of the client terminal 100 transmits the sensor information acquired by the sensor unit 110 to the log serer 200. The communication unit 130 receives the action log supplied from the analysis server 300 based on action log acquisition information and outputs the action log to the control unit 120.

The input unit 140 is a manipulation unit that is used for the user to input information. For example, a touch panel, a keyboard, or a button can be used. The user uses the input unit 140, for example, to activate an application that displays the action log, manipulate display of the action log, and input the correction information of the action log.

The display processing unit 150 causes the display unit 160 to display the action log supplied from the analysis server 300. The display processing unit 150 represents the action log using the action recognition result object 414, for example, as illustrated in FIG. 2, and causes the display unit 160 to display the action log. The display processing unit 150 also changes display content of the display unit 160 according to input information from the input unit 140.

The display unit 160 is installed to display information. For example, a liquid crystal display or an organic EL display can be used. A UI or the like displayed and processed by the display processing unit 150 is displayed on the display unit 160.

[2.2. Log Server]

The log server 200 includes a communication unit 210, a control unit 220, and a log DB 230, as illustrated in FIG. 2.

The communication unit 210 is a functional unit that transmits and receives information to and from a terminal, a server, or the like connected via a network. The communication unit 210 of the log server 200 outputs the sensor information received from the client terminal 100 to the control unit 220. The communication unit 210 receives an information presentation request from the analysis server 300 and transmits the sensor information acquired by the control unit 220 to the analysis server 300.

The control unit 220 is a functional unit that controls an overall function of the log server 200. For example, the control unit 220 records the sensor information received from the client terminal 100 and records the sensor information in the log DB 230 for each user. The control unit 220 acquires the sensor information in response to a request from the analysis server 300 and transmits the sensor information to the analysis server 300 via the communication unit 210.

The log DB 230 is a storage unit that stores the sensor information acquired as information regarding actions of the user. The log DB 230 stores the sensor information for each user.

[2.3. Analysis Server]

The analysis server 300 includes a communication unit 310, a control unit 320, an action recognition unit 330, a correction unit 340, an action log DB 350, and an analysis DB 360, as illustrated in FIG. 2.

The communication unit 310 is a functional unit that transmits and receives information to and from a terminal, a server, or the like connected via a network. The communication unit 310 of the analysis server 300 acquires the sensor information from the log server 200 and outputs the sensor information to the control unit 320. The communication unit 310 receives an action log presentation request received from the client terminal 100 and transmits the corresponding action log of the user to the client terminal 100.

The control unit 320 is a functional unit that controls an overall function of the analysis server 300. For example, the control unit 320 outputs the sensor information acquired from the log server 200 to the action recognition unit 330. The control unit 320 receives the action log presentation request from the client terminal 100, acquires the corresponding action log from the action log DB 350, and transmits the action log to the client terminal 100 via the communication unit 310. Further, the control unit 320 outputs the correction information of the action log received from the client terminal 100 to the correction unit 340.

The action recognition unit 330 executes an action recognition process based on the sensor information received from the log server 200 to analyze an operation action of the user. The action recognition unit 330 records an action recognition result as an action log in the action log DB 350.

The correction unit 340 corrects the action recognition result acquired through the action recognition process by the action recognition unit 330 based on the correction information of the action log received from the client terminal 100. The details of the correction unit 340 will be described below.

The action log DB 350 stores the action recognition result analyzed by the action recognition unit 330 as an action log. The action log stored in the action log DB 350 is supplied to the client terminal 100 in response to an action log presentation request as a request from the client terminal 100.

The analysis DB 360 is a storage unit that stores various kinds of information to be used in processes which are executed in the action recognition unit 330 and the correction unit 340. For example, the analysis DB 360 stores threshold information which is used for a vehicle determination process in the action recognition process by the action recognition unit 330 and various kinds of information which are used for the correction process by the correction unit 340. The various kinds of information stored in the analysis DB 360 are set in advance, but can be changed appropriately.

3. ACTION LOG DISPLAY PROCESS

Figure 4:
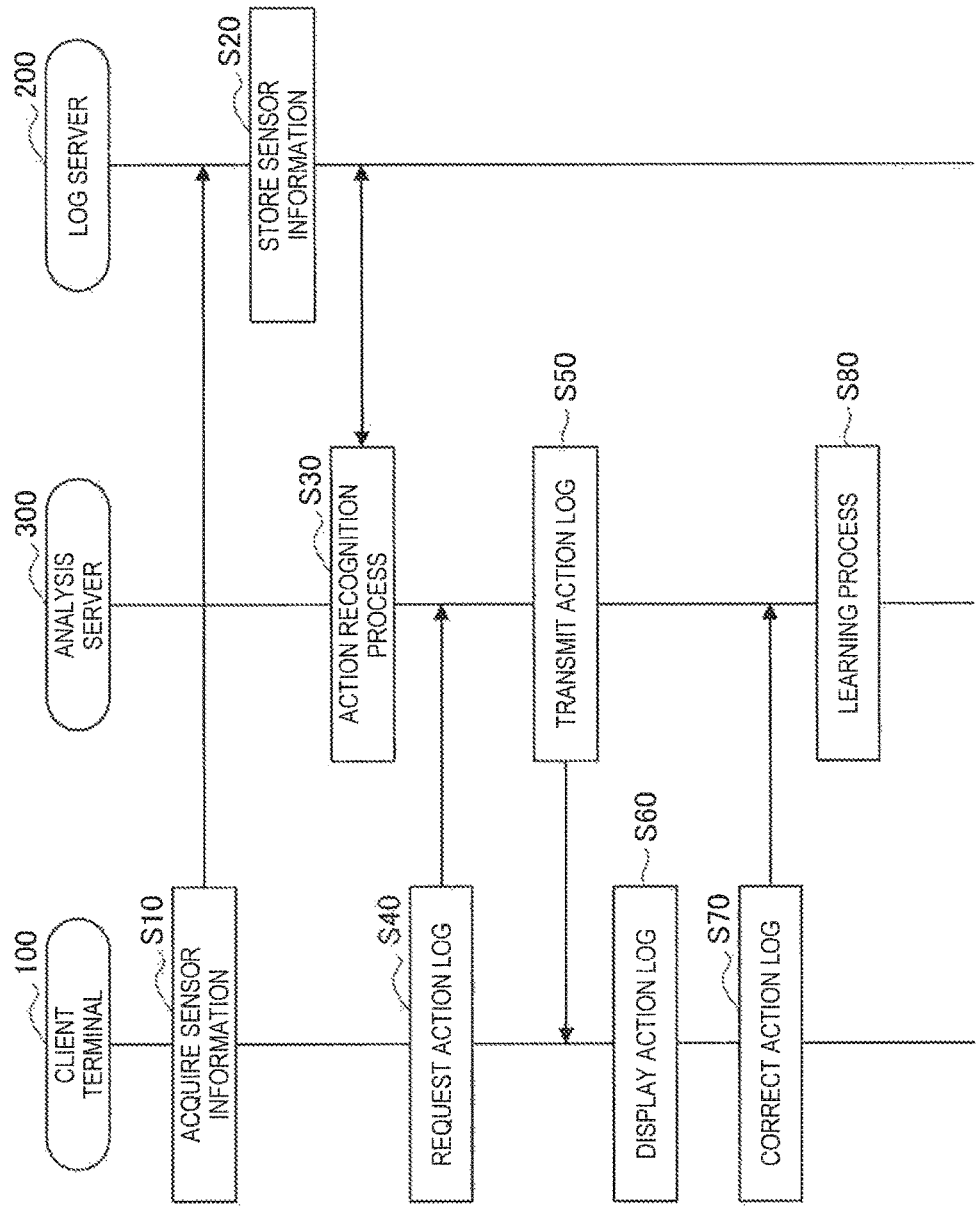
FIG. 4 is a timing chart illustrating an overview of an action log display process according to the embodiment.

An action log display process according to the embodiment will be described with reference to FIG. 4. FIG. 4 is a timing chart illustrating an overview of the action log display process according to the embodiment. The action log display process according to the embodiment includes a process related to acquisition of the sensor information (S10 and S20), an action recognition process (S30), an action log presentation process (S40 to S60), an action log correction process (S70) by the user, and a personalization learning process based on the correction information (S80).

[3.1. Process Related to Acquisition of Sensor Information]

In order to acquire an action log to be presented to the user, the sensor information is acquired as information regarding actions of the user. The sensor information is acquired by the sensor unit 110 of the client terminal 100 (S10). The client terminal 100 is a terminal which is held every day by the user who receives services of the action log display system. The sensor unit 110 acquires information of a position or a motion of the user from moment to moment and continuously records the information as the sensor information in association with time information. The client terminal 100 has an authentication function, and thus the acquired sensor information is used as information regarding the actions of the authenticated user.

The client terminal 100 transmits the acquired sensor information to the log server 200 at a predetermined timing. For example, the sensor information is transmitted at a predetermined time interval or is transmitted, for example, when the user explicitly gives an instruction to transmit the sensor information. The log server 200 receiving the sensor information records the user ID of the user and the sensor information in the log DB 230 in association therewith (S20).

3.2 Action Recognition Process (1) Overview of Action Recognition Process

The analysis server 300 executes an action recognition process based on the sensor information recorded in the log server 200 at a predetermined timing. For example, the analysis server 300 acquires the sensor information from the log server 200 at a predetermined time interval and analyzes actions of each user. In the action recognition process, signal processing or statistical processing for the sensor information is executed to recognize a situation or the actions of the user. The action recognition process may be executed using, for example, a known technology such as a technique disclosed in the foregoing Patent Literature 1.

For example, the action recognition unit 330 holds a correspondence relation between an operation action and an action model which is information regarding the actions of the user obtained as a result by processing the sensor information in advance. When action parameters are obtained by processing the sensor information, the action recognition unit 330 specifies action content corresponding to the action parameters. As described above, examples of the recognized action content include "walking," "running," "moving by bicycle," "moving by train," "moving by bus," "moving by car," "moving by another vehicle," and "still." The action recognition unit 330 sets the action log by associating the specified action content with an action time, an action clock time, positional information, the user ID, and the like and records the action log in the action log DB 350.

(2) Filter Process on Positional Information

Here, actions related to movement methods such as "walking," "running," "moving by bicycle," "moving by train," "moving by bus," and "moving by car" in the action content recognized by the action recognition unit 330 are specified based on a result obtained by executing signal processing or statistical processing on the sensor information or speed information calculated from the positional information. When the speed information is calculated based on the positional information, the positional information is acquired in accordance with, for example, network information of the GPS installed in the client terminal 100 or Wi-Fi to which the client terminal 100 is connected. However, depending on precision of a position identification technology, much noise may be contained in the positional information acquired in this way. Reliability of the speed information calculated from the positional information with much noise is low and the action content is prevented from being determined accurately.

Figure 5:
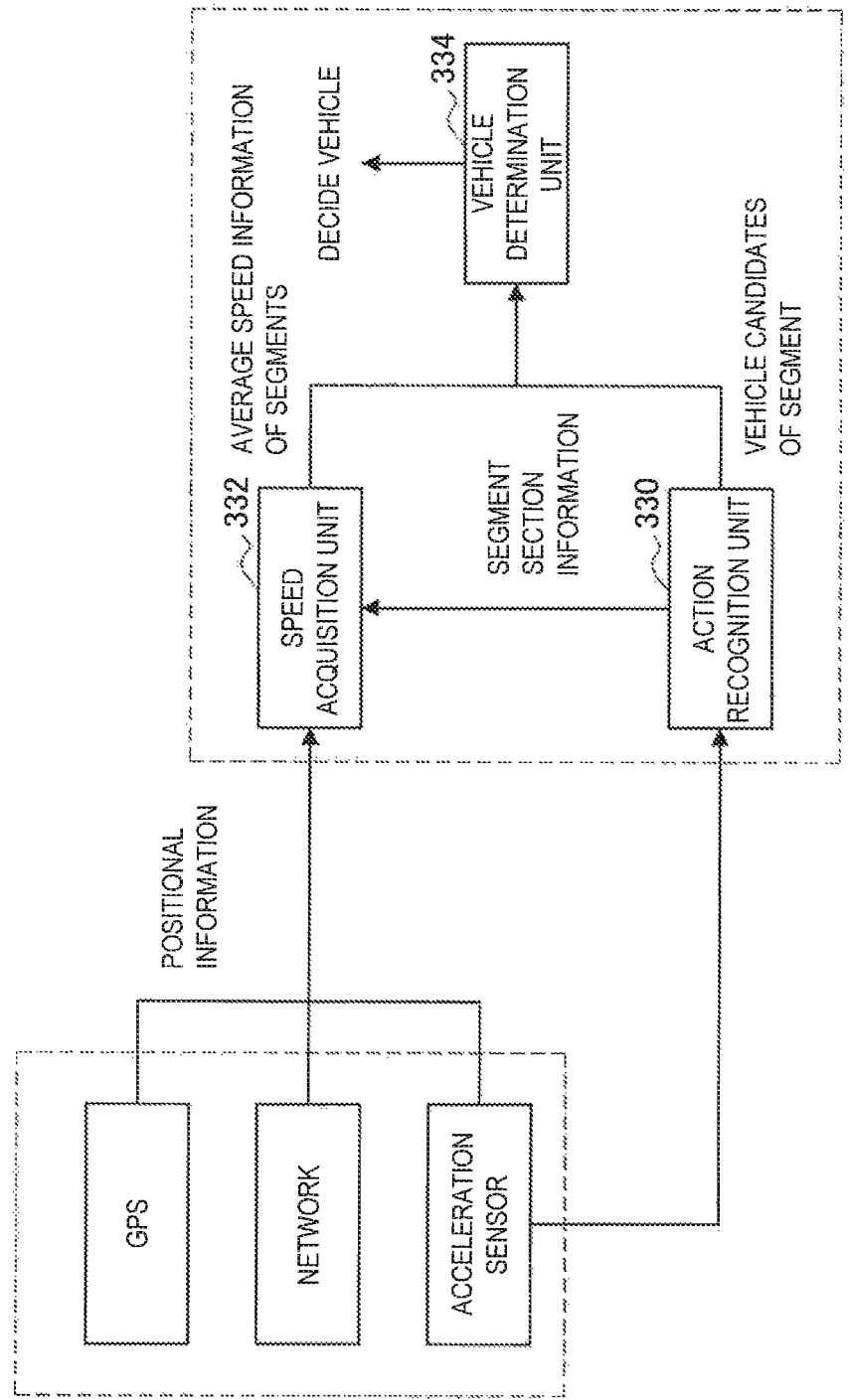
FIG. 5 is a block diagram illustrating each functional unit executing a filter process on positional information and executing an action recognition result decision process.
Figure 6:
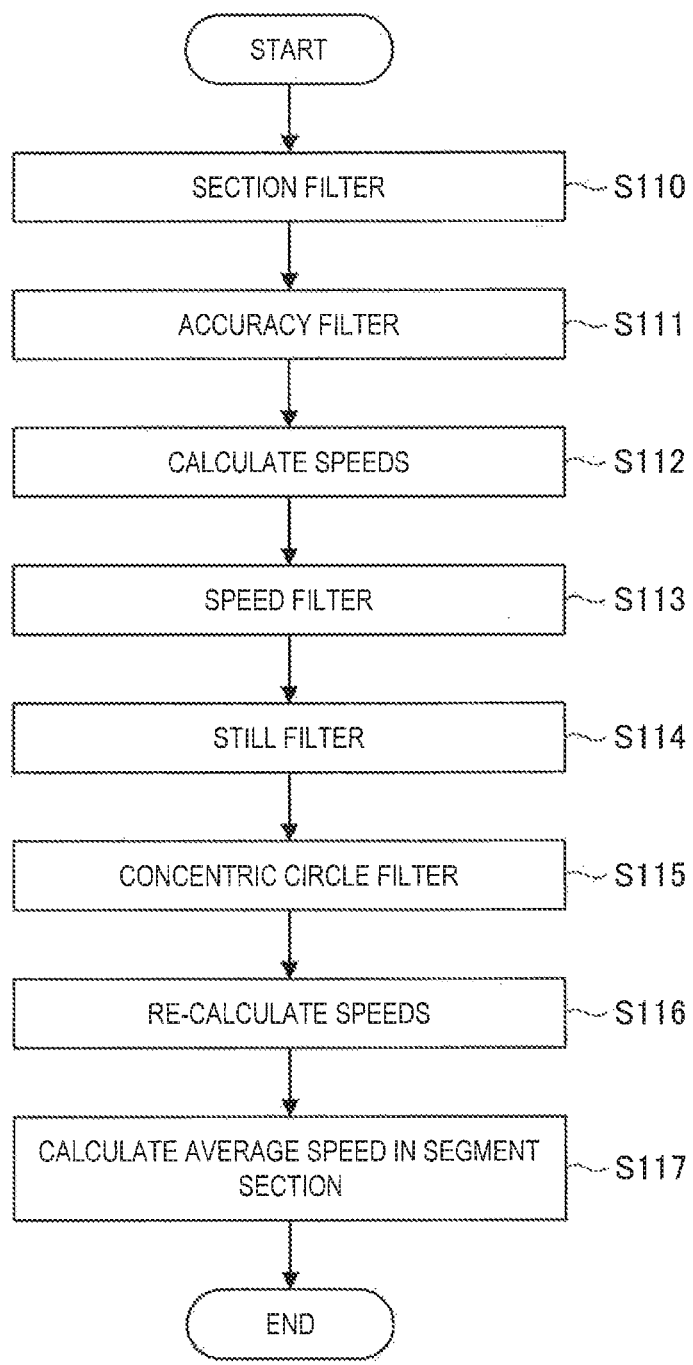
FIG. 6 is a flowchart illustrating a filter process on positional information and a process of calculating an average speed of a segment section.

Accordingly, in order to improve the precision of an action recognition result obtained through the action recognition process by the action recognition unit 330, a filter process of removing noise from the positional information may be executed. Hereinafter, the filter process executed on the positional information according to the embodiment will be described with reference to FIGS. 5 to 17. FIG. is a block diagram illustrating each functional unit executing a filter process on the positional information and executing the action recognition result decision process. FIG. 6 is a flowchart illustrating the filter process on the positional information and a process of calculating an average speed of a segment section. FIGS. 7 to 16 are explanatory diagrams illustrating content of the filter process on the positional information. FIG. 17 is a flowchart illustrating the action recognition result decision process based on speed information calculated from the positional information subjected to the filter process.

(a. Functional Configuration)

In the embodiment, functional units that execute the filter process on the positional information and the action recognition result decision process are installed in the analysis server 300. Specifically, as illustrated in FIG. 5, a speed acquisition unit 332 and a vehicle determination unit 334 are installed in the analysis server 300.

The speed acquisition unit 332 executes a filter process on the positional information to acquire the speed information. The positional information subjected to the filter process by the speed acquisition unit 332 includes time information and longitude and latitude information at that time and is specified by information acquired by the GPS, network information, and acceleration sensor. The speed acquisition unit 332 executes a filter process such as a section filter, an accuracy filter, a speed filter, a still filter, or a concentric circle filter on the positional information, and subsequently calculates an average speed of a segment section.

The vehicle determination unit 334 executes the action recognition result decision process based on the average speed of the segments acquired by the speed acquisition unit 332. The vehicle determination unit 334 determines whether the movement method is correct in the action content of a segment specified by the action recognition unit 330 based on the average speed of the segments. The movement method output by the vehicle determination unit 334 is decided as final action content.

(b. Process by Speed Acquisition Unit)

The filter process on the positional information and the process of calculating an average speed of a segment section by the speed acquisition unit 332 will be described with reference to FIG. 6.

Section Filter Process

First, the speed acquisition unit 332 executes a section filter process of specifying a section of the action segment based on the positional information specified by the information acquired by the GPS, the network information, and the acceleration sensor (S110). The section of the action segment is specified in accordance with a start time and an end time of an action. The speed acquisition unit 332 finally calculates an average speed in the specified section.

Here, the speed acquisition unit 332 may set a section obtained by taking the section of the action segment long before and after a section specified by the start time and the end time of the action by a predetermined time. Thus, a speed can be acquired at the start time and the end time of the action. Further, when the start position or the end position of the action is erroneously detected, it is possible to improve a possibility of the positional information of the start position or the end position being detected to be erroneous.

For example, when there is positional information before the start position of the action, there is a possibility of an error being detectable in a speed filter process (S113) to be described below. At this time, there is the possibility of an error being in the positional information before the start position, but when errors are in a predetermined number of pieces of positional information rather than one piece of positional information before the start position, there is a low possibility of the errors affecting positions subsequent to the start position. Further, even in a concentric circle filter process (S115) to be described below, there is a possibility of errors of the start position and the end position being detected.

The predetermined time in which the section of the action segment is set to be long may be about several seconds (for example, 3 seconds) before and after the section, but the present technology is not limited to this example. When the positional information may not be acquired for ±several seconds for convenience of the system, the number of pieces of data added before and after can be reduced. However, when the number of piece of data is reduced, there is a high possibility of errors of the start position and the end position being missed. In contrast, by increasing the amount of data added before and after, there is a high possibility of the start position and the end position being detectable. However, the number of pieces of positional information to be stored or a processing amount increases. The predetermined time in which the section of the action segment is set to be long is appropriately set in consideration of these facts.

Accuracy Filter Process

Subsequently, the speed acquisition unit 332 executes an accuracy filter process of excluding positional information in which a position is inaccurate among pieces of positional information included in the section of the action segment (S111). The accuracy filter process is executed based on an accuracy value added to the positional information. The accuracy value is information appended to positional information output from GPS or the like, and accuracy of positional information is represented by, for example, a probability of presence in a circle set using the accuracy value as a radius centering on a position specified by latitude and longitude information. For example, the accuracy of the positional information is represented in such a manner that "a possibility of presence in a circle in which a radius is an accuracy value [m] is 85%." Thus, a larger accuracy value indicates that a position is more inaccurate.

Here, the precision of the positional information decreases as the accuracy value increases. When the accuracy value exceeds a predetermined value, the precision of the positional information tends to be lowered more than the precision of the positional information indicated by the accuracy value is indicated. Accordingly, the speed acquisition unit 332 regards the positional information in which the accuracy value exceeds the predetermined value as positional information from which precision necessary to calculate a speed is not obtainable and excludes this positional information. A threshold of the accuracy value by which the positional information is excluded can be appropriately set according to the system and may be set to, for example, 2000 m. When the threshold is set to be large, more points can be adopted to handle minute changes in a position. However, an erroneous position is easily picked up. The threshold of the accuracy value is set in consideration of this fact.

Figure 7:
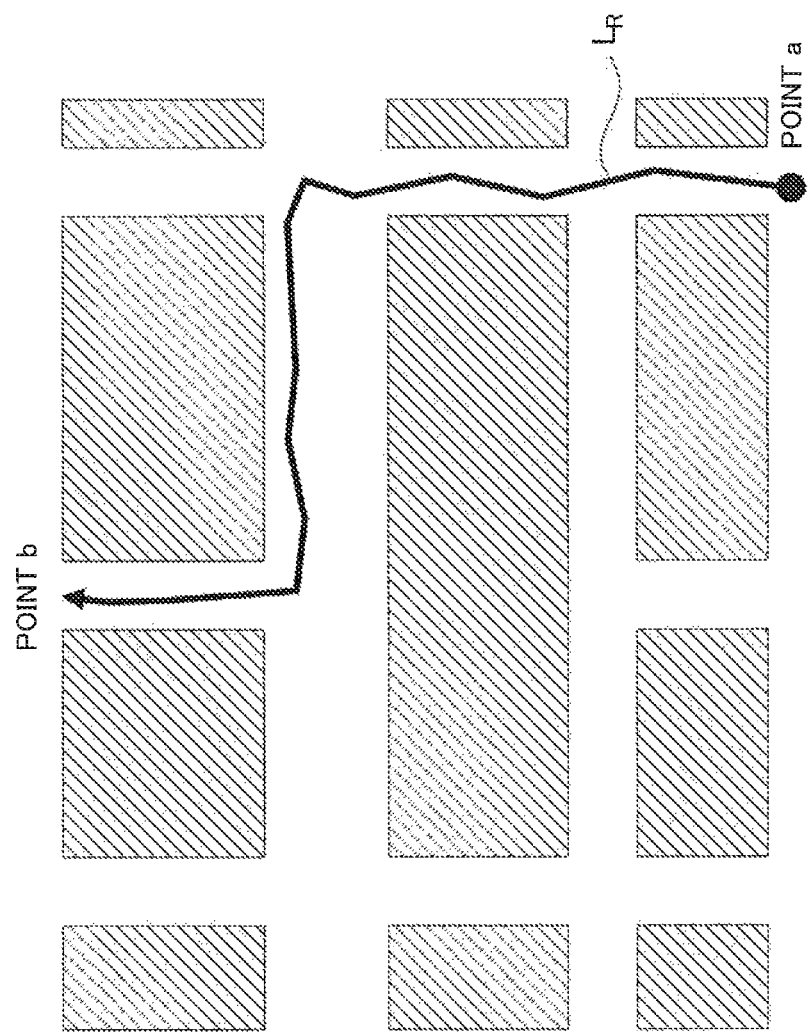
FIG. 7 is an explanatory diagram illustrating content of the filter process on the positional information and illustrating content of an action segment moved from a point a to a point b along a locus $L_R$.
Figure 8:
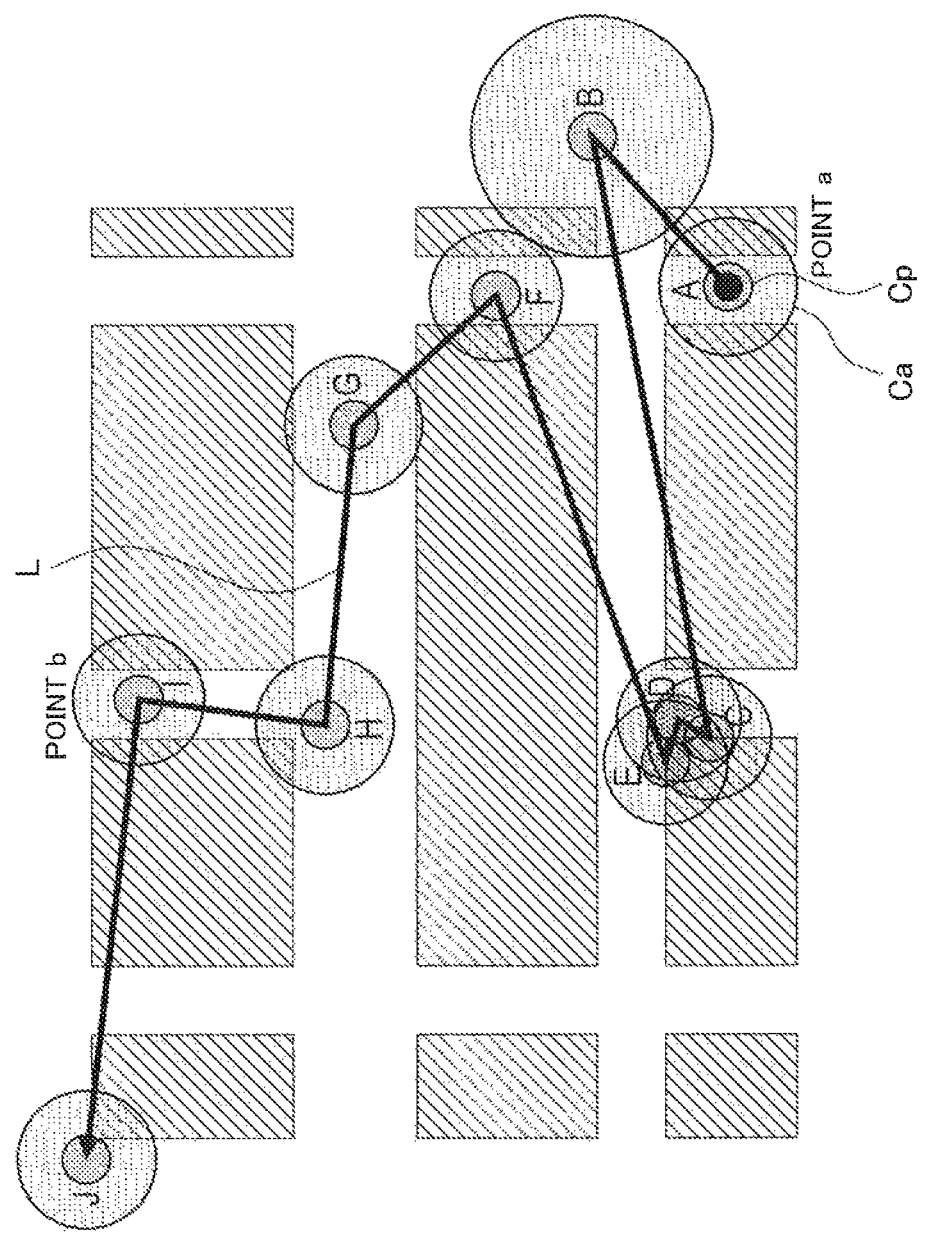
FIG. 8 is an explanatory diagram illustrating positional information included in a section of the action segment of FIG. 7 and a locus L acquired by interpolating the positional information into a straight line.

For example, as illustrated in FIG. 7, an action segment which is moved from a point a to a point b along a locus $L_R$ will be considered. In a section of the action segment in which the point a is set as a start position and the point b is set as an end position, as illustrated in FIG. 8, 10 pieces of positional information of points A to J are assumed to be included. Inner circles Cp of the points A to J in FIG. 8 represent points at which positional information is acquired, and these points are interpolated in straight lines to acquire a locus L. Outer circles Ca of the points A to J express accuracy values. The positional information at that point is represented as being more inaccurate as the circle is larger.

Figure 9:
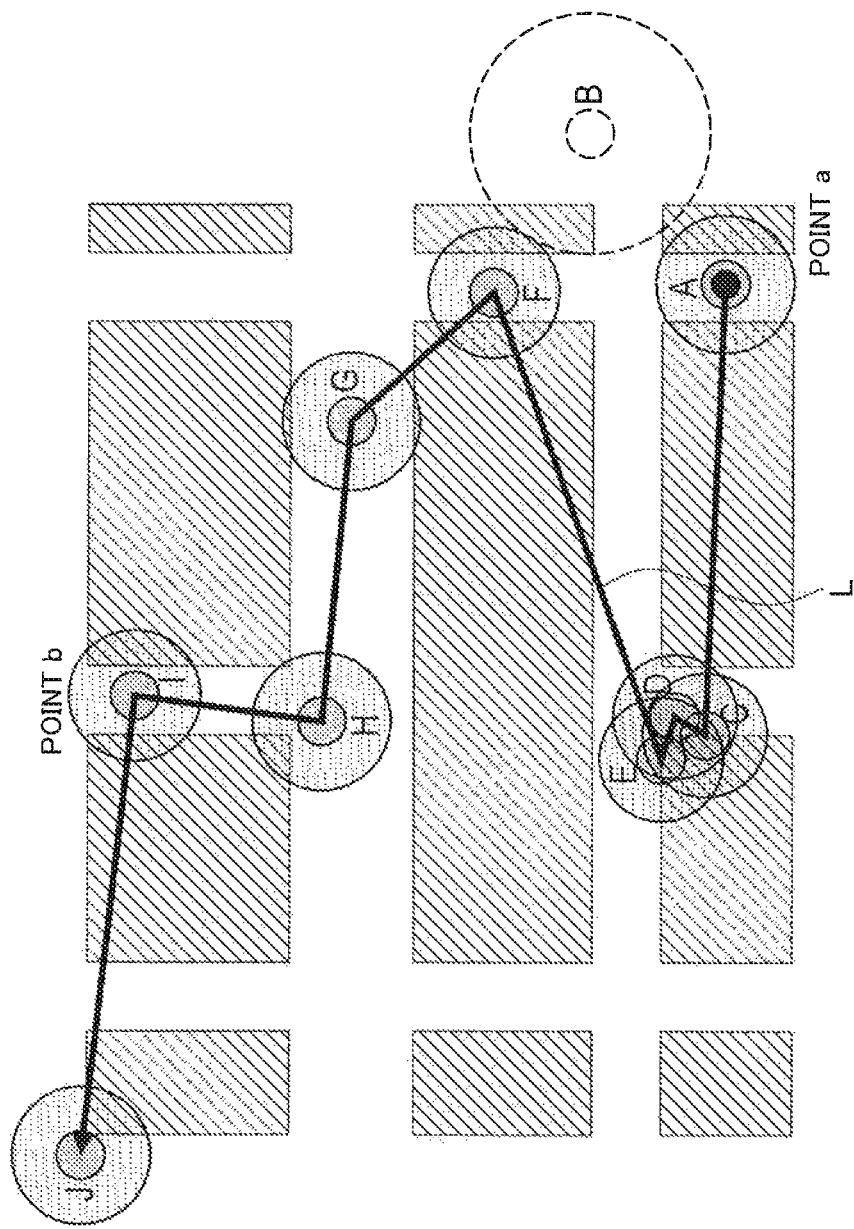
FIG. 9 is an explanatory diagram illustrating a state in which positional information of a point B in FIG. 8 is excluded through an accuracy filter process.

For example, the accuracy value at the point B is assumed to exceed the predetermined value among the points included in section of the action segment in FIG. 8. At this time, as illustrated in FIG. 9, the speed acquisition unit 332 excludes the positional information of the point B and resets the locus L.

Speed Filter Process

Then, after the speed acquisition unit 332 executes the accuracy filter process, the speed acquisition unit 332 calculates a speed between two temporally adjacent points based on the positional information included in the section of the action segment (S112) and executes a speed filter process on each of the calculated speeds (S113).

Figure 10:
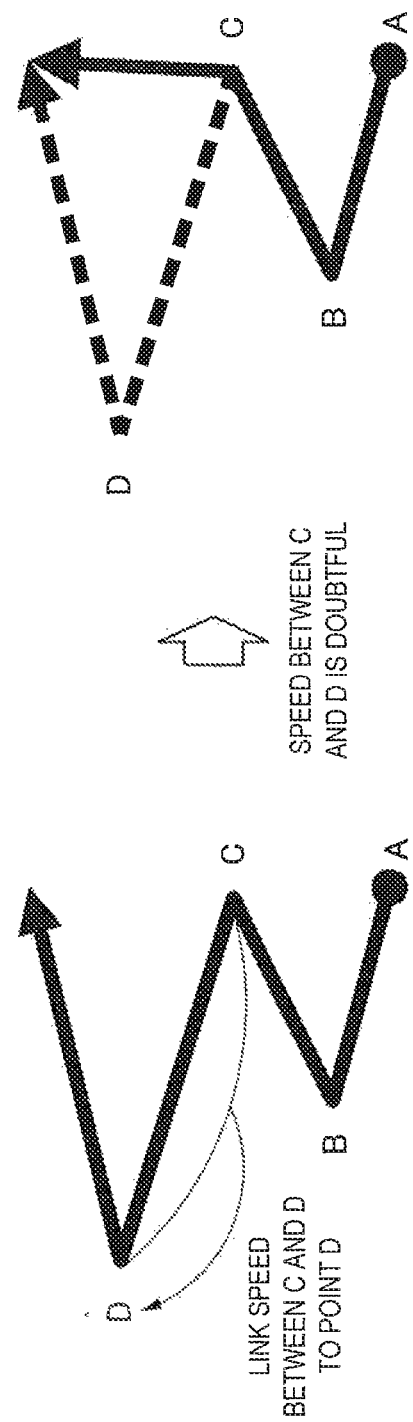
FIG. 10 is an explanatory diagram illustrating a speed filter process.

The speed acquisition unit 332 calculates an average speed between the adjacent points from latitude and longitude information and times of the points included in the section of the action segment and links the average speed with the positional information of the terminal point side of two points as a speed between two points. For example, a speed between the points C and D illustrated on the left side of FIG. 10 represents an average speed calculated from the latitude and longitude information and the times of the points C and D, and the speed is linked to the point D on the terminal point side.

Then, the speed acquisition unit 332 determines whether each of the calculated speeds exceeds a predetermined speed considered to be practically doubtful and excludes the positional information to which the speed determined to be doubtful is linked. For example, in FIG. 10, when the speed of the point D exceeds the predetermined speed, the positional information of the point D is determined to be doubtful, and thus is excluded. The predetermined speed used to determine whether the positional information is doubtful may be set to, for example, several hundred km/h (for example, 400 km/h). Here, an airplane moves at 400 km/h or more in some cases. However, when the positional information before and after is correct in final speed recalculation (S116) despite the exclusion of all of the points at which the speed is 400 km/h or more in the section of the action segment in step S113, a possibility of the speed equal to or greater than 400 km/h being correctly calculated remains, and thus there is no problem.

When the value of the predetermined speed which is the threshold of the speed filter process is set to be large, there is a high possibility of a vehicle being recognizable faster, but there is a high possibility of an error being accepted. The threshold of the speed is set in consideration of this fact.

Figure 11:
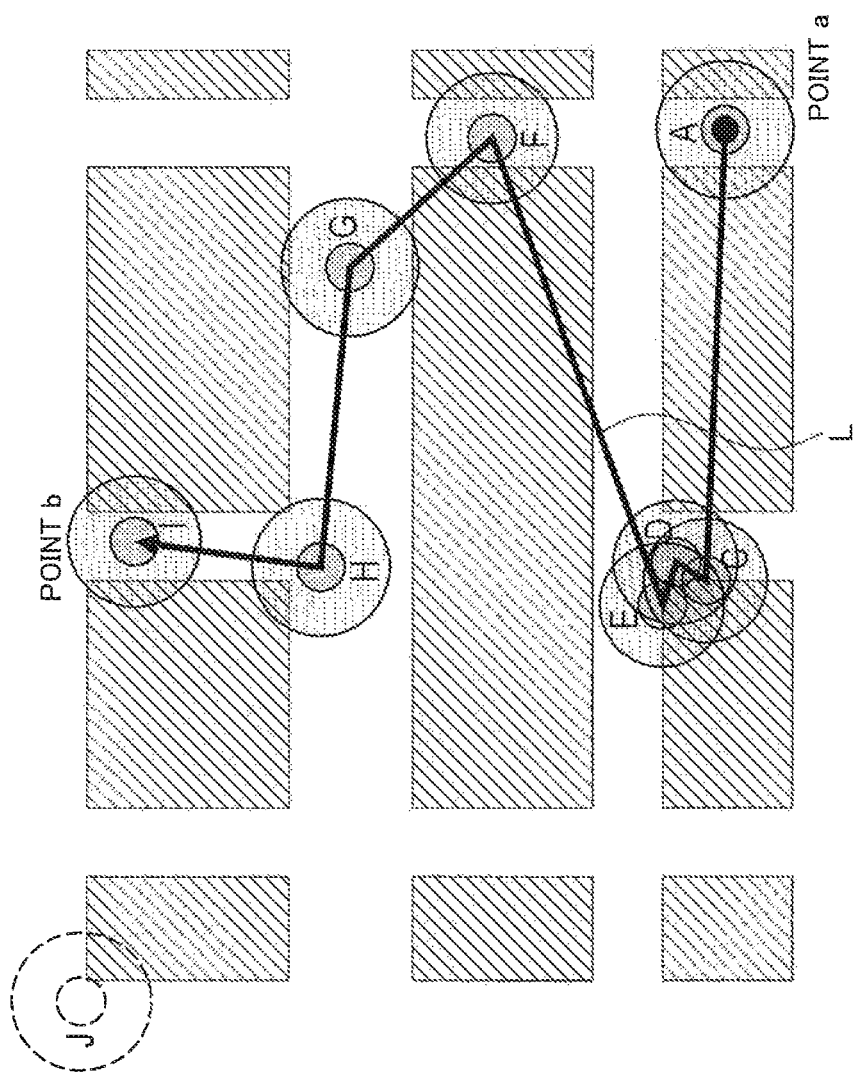
FIG. 11 is an explanatory diagram illustrating a state in which positional information of a point J in FIG. 9 is excluded through the speed filter process.

For example, in the example illustrated in FIGS. 7 to 9 described above, the speed at each of the points included in the section of the action segment in FIG. 9 is calculated and the speed at the point J is assumed to exceed the predetermined speed when the speed filter of step S113 is executed. At this time, as illustrated in FIG. 11, the speed acquisition unit 332 determines that the point J is doubtful and excludes the point J from the section of the action segment.

Still Filter Process

Subsequently, the speed acquisition unit 332 executes a still filter process of specifying and condensing points temporarily staying at the same spot from the points included in the action segment (S114). When there are a plurality of points temporarily staying at the same spot in the still filter process, the points are determined to be still and these points are condensed into two points, temporal initial and terminal points.

Figure 12:
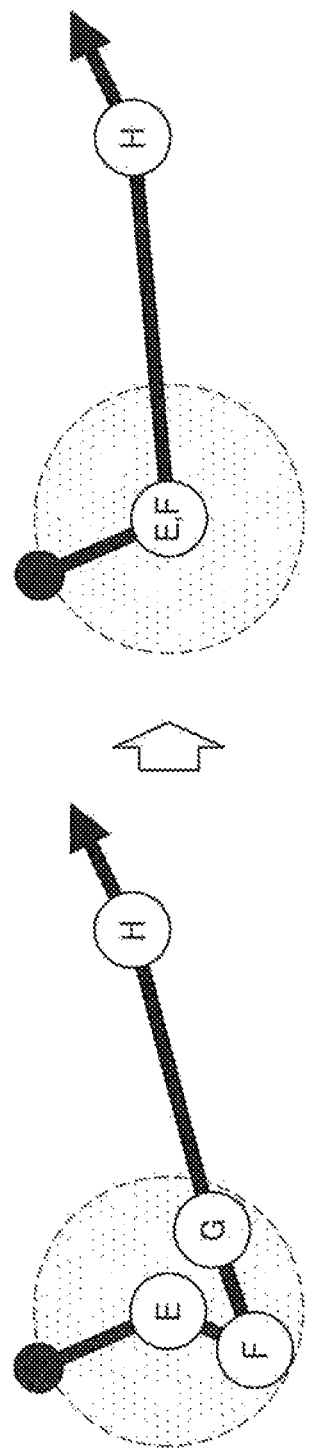
FIG. 12 is an explanatory diagram illustrating a still filter process.

The detailed description will be made with reference to FIG. 12. The left side of FIG. 12 illustrates positional information included in a certain action segment before the still filter process and there are four points, points E to H. The speed acquisition unit 332 first determines whether the point F is still by paying attention to the temporally first point E and determining whether the successive point F is within a predetermined range from the point E. The predetermined range may be, for example, a range within 50 m from the origin (herein, the point E). This range can be appropriately changed.

When the speed acquisition unit 332 determines that the point F is still, the speed acquisition unit 332 also determines whether the successive point G is within the predetermined range from the E point serving as the origin. By repeating this process, the point is determined to be still until the point becomes far from the predetermined range of the point E serving as the origin. For example, the point H is assumed to become far from the predetermined range of the point E. At this time, the speed acquisition unit 332 determines that a section of three points from the points E to G is still.

Then, the speed acquisition unit 332 excludes the point F which is a point other than the initial point or the terminal point among the three points. Further, the speed acquisition unit 332 corrects the positional information of the G point which is the terminal point into the same positional information as the point E which is the initial point. Consequently, in the still section, two points, the points E and G in which the positional information is the same and time information is different, remain. By causing the two points with the different pieces of time information to remain, it is possible to acquire time information of the still section. The positional information of the terminal point is matched to the positional information of the initial point because the still section is used in the concentric filter process to be described below.

Figure 13:
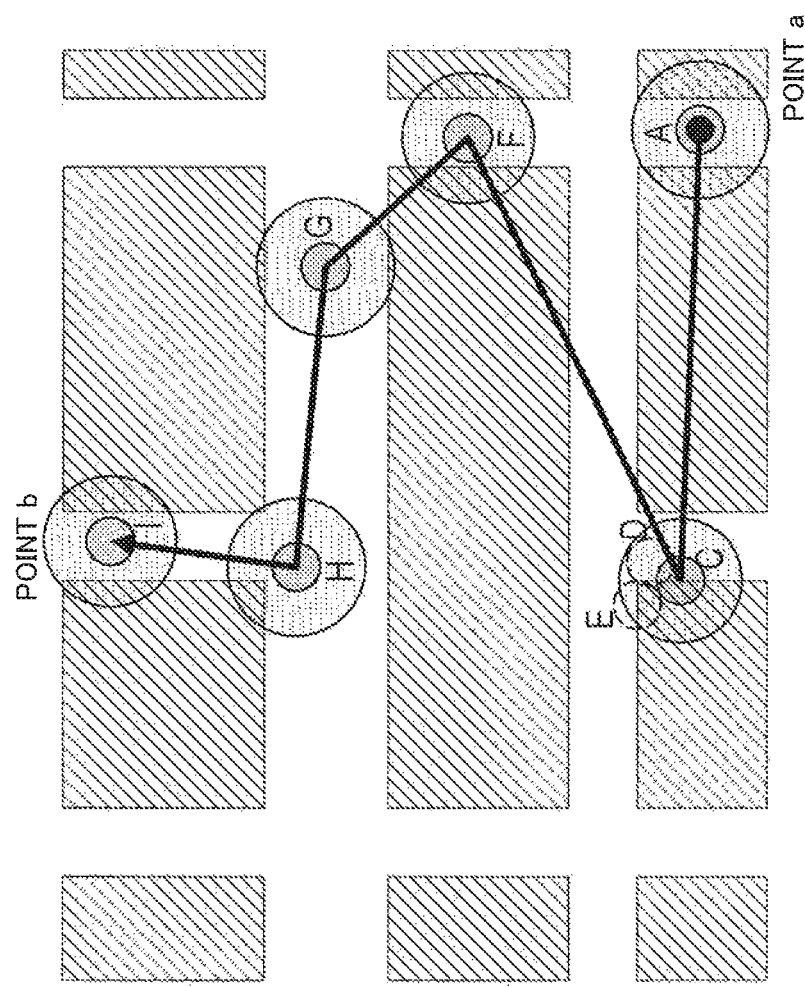
FIG. 13 is an explanatory diagram illustrating a state in which positional information of a point D in FIG. 11 is excluded and positional information of a point E matches positional information of a point C through the still filter process.
Figure 14:
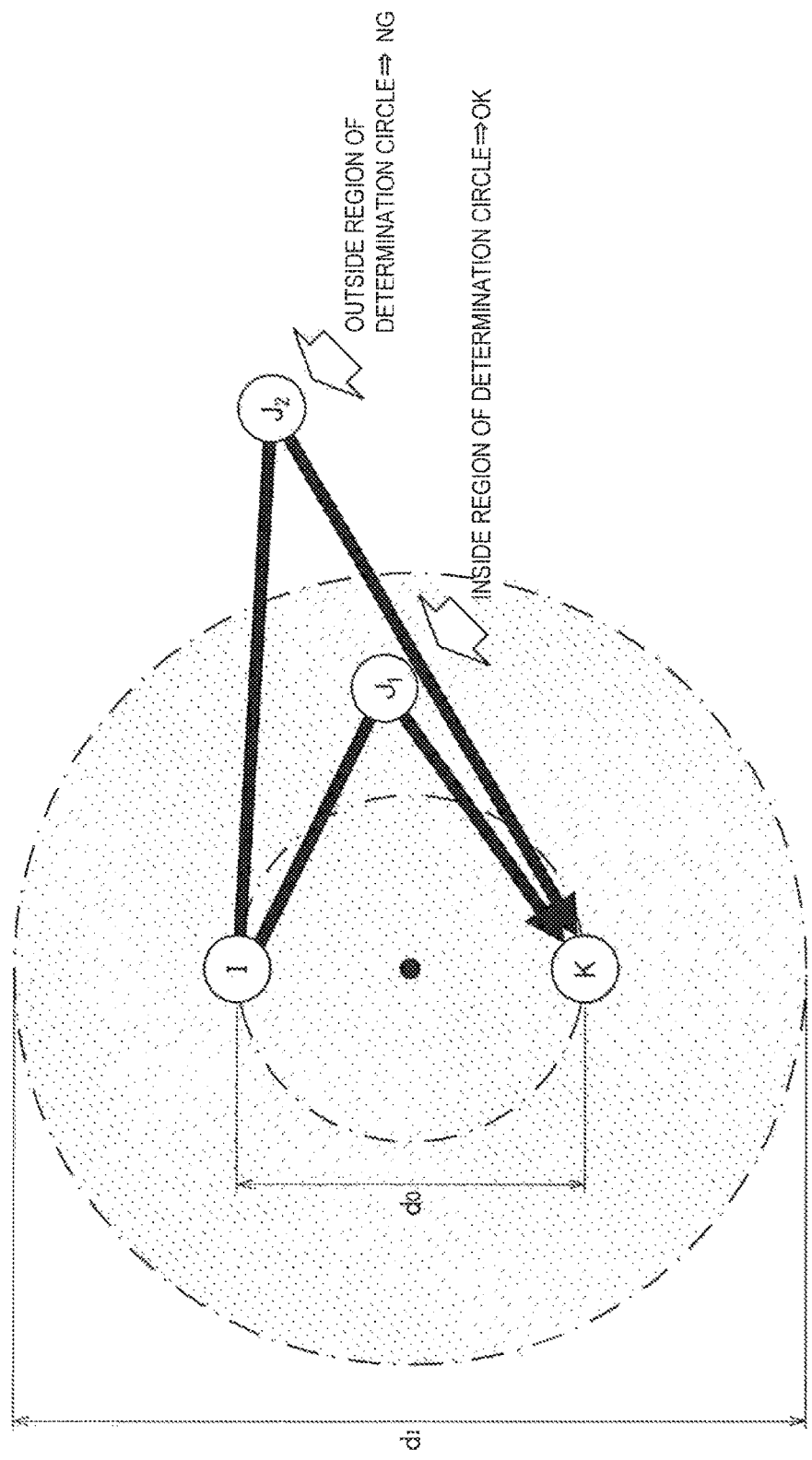
FIG. 14 is an explanatory diagram illustrating a concentric circle filter process.

For example, in the example illustrated in FIG. 11 described above, the points C, D, and E are determined to be still when the still filter of step S114 is executed. At this time, as illustrated in FIG. 13, the speed acquisition unit 332 causes the point C which is the initial point and the point E which is the terminal point to remain, excludes the point D which is a middle point, and matches the positional information of the point E which is the terminal point to the positional information of the point C which is the initial point.

Concentric Filter Process

Further, the speed acquisition unit 332 executes a concentric filter process of determining a positional relation among three temporally successive points and determining whether a motion is not unnatural (S115). In the concentric filter process, it is determined whether a middle point between an initial point and a terminal point among three temporally successive points is located outside a region of a determination circle which is a concentric circle with a standard circle that has a straight line connecting the initial point to the terminal point as a diameter and has a larger diameter than the standard circle. For example, in FIG. 14, points I, J ($J_1$ and $J_2$), and K which are three temporally successive points are assumed to be present. At this time, in regard to a standard circle that has a straight line connecting the point I which is the initial point to the point K which is the terminal point as a diameter $d_0$, a determination circle that is a concentric circle with the standard circle and has a larger diameter $d_1$ than the standard circle is set. The diameter $d_1$ of the determination circle may be larger than the diameter do and may be, for example, twice the diameter $d_0$.

In one action segment, either one piece of action content or stillness is indicated. Thus, the middle point among the three temporally successive points is considered to be rarely present outside the region of the determination circle. Accordingly, the speed acquisition unit 332 excludes the middle point when the middle point between the initial point and the terminal point among the three temporally successive points is outside the determination region. For example, in the example of FIG. 14, the middle point J is inside the region of the determination circle, and thus remains. However, the middle point $J_2$ is outside the region of the determination circle, and thus is excluded.

Figure 15:
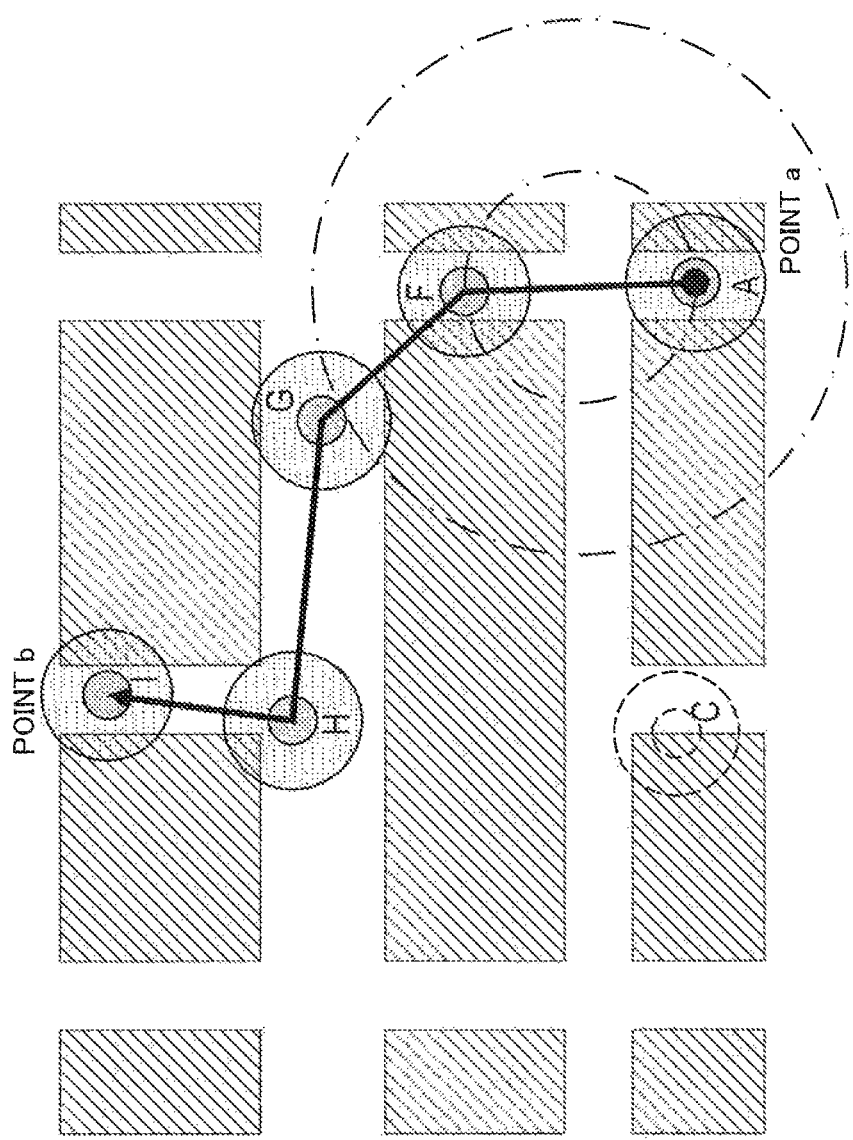
FIG. 15 is an explanatory diagram illustrating a state in which the positional information of a point C in FIG. 13 is excluded through the concentric circle filter process.

Here, in the example illustrated in FIG. 13 described above, when the concentric filter of step S115 is executed, it is assumed that the middle point C among three temporally successive three points, the points A, C, and F, is determined to be outside the region of the determination circle. At this time, the speed acquisition unit 332 excludes the point C which is the middle point, as illustrated in FIG. 15. The point E condensed in the same positional information as the point C is also excluded together with the point C.

Figure 16:
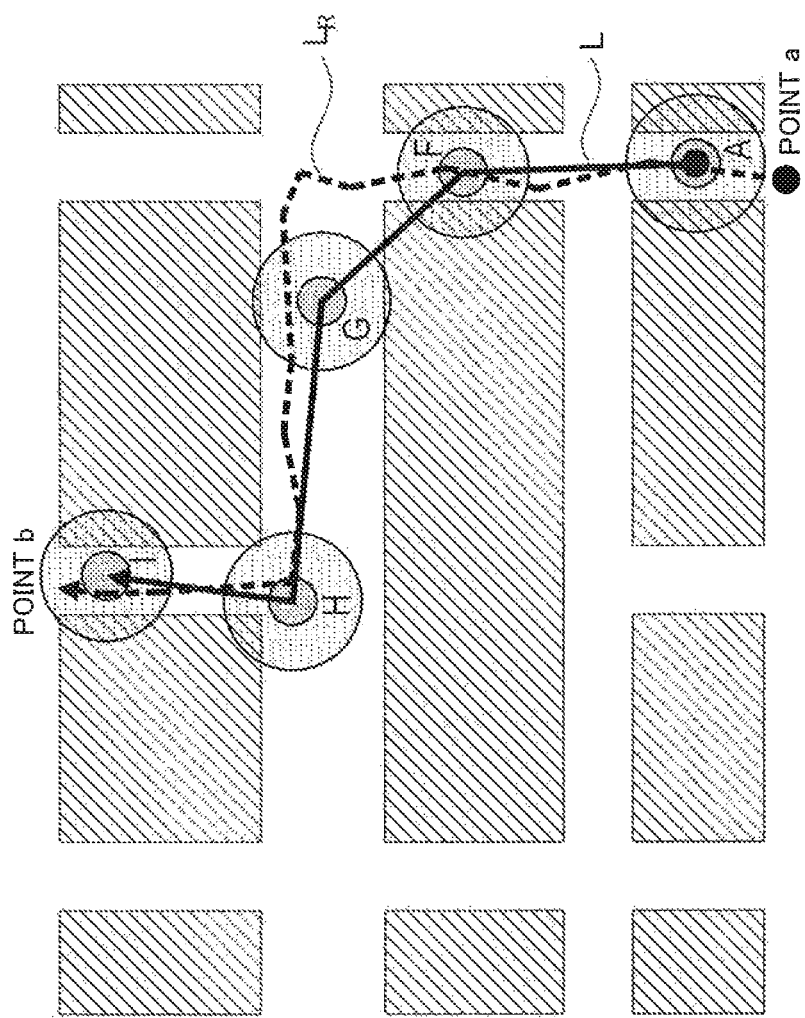
FIG. 16 is an explanatory diagram illustrating the locus L obtained after the filter process is executed on the positional information of each point illustrated in FIG. 8.
Figure 17:
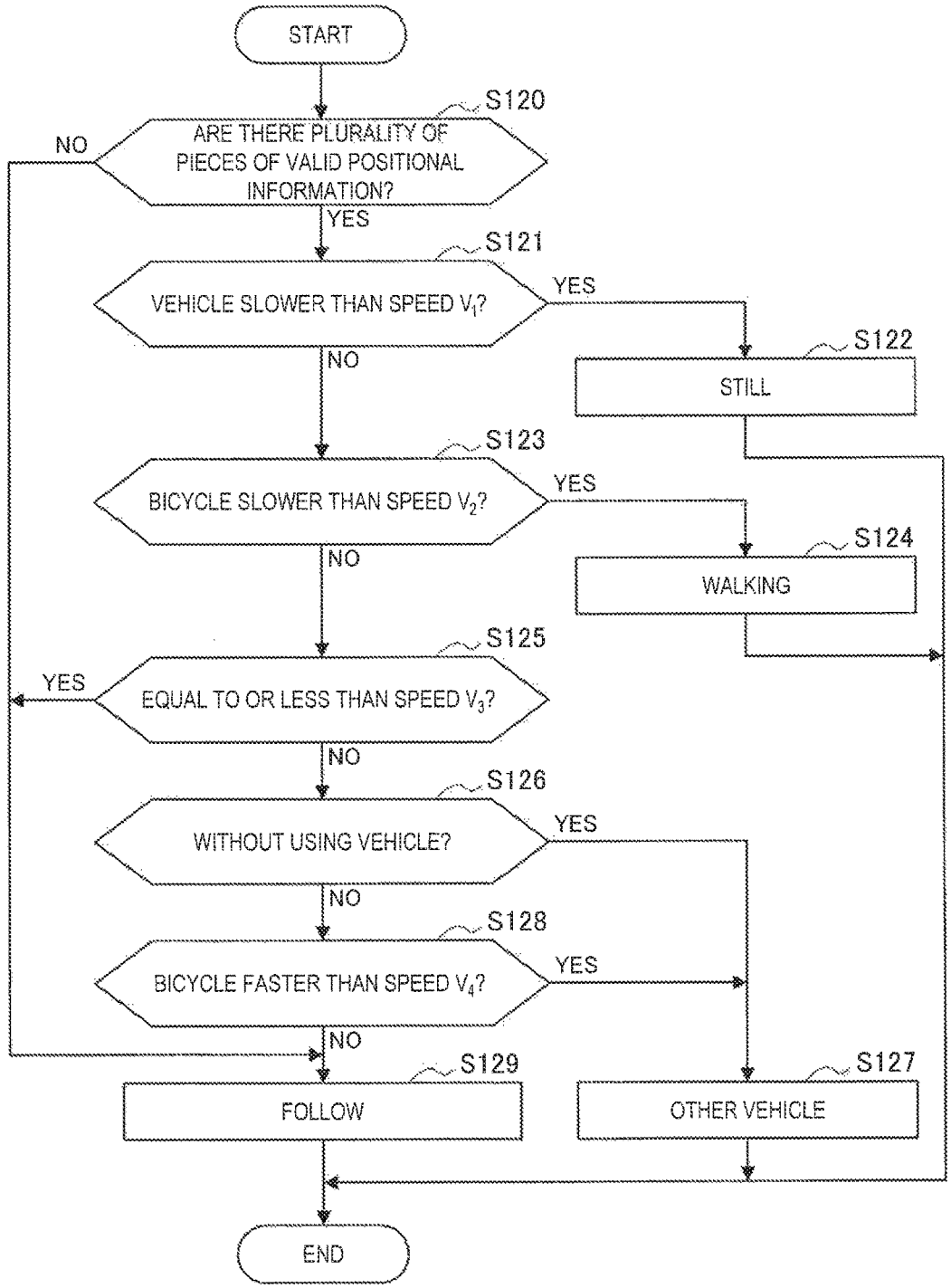
FIG. 17 is a flowchart illustrating the action recognition result decision process based on speed information calculated from the positional information subjected to the filter process.

Through the above-described filter process, as illustrated in FIG. 16, the points A, F, G, H, and I finally remain among the points A to J included in the section of the action segment illustrated in FIG. 8. The locus L obtained by interpolating and connecting the positional information of the remaining points in straight lines is close to the actual locus $L_R$. In this way, by executing the filter process on the positional information, it is possible to extract the positional information with high precision and recognize the actions more accurately.

Average Speed Calculation of Section of Action Segment

After the processes of steps S110 to S115 are executed, the speed acquisition unit 332 calculates a speed between two adjacent points based on the extracted positional information, as in step S112 (S116). Then, an average speed of the speeds calculated in step S116 is calculated as a speed in the section of the action segment (S117).

(c. Process by Vehicle Determination Unit)

When the average speed in the segment section is calculated through the process of the speed acquisition unit 332 illustrated in FIG. 6, the vehicle determination unit 334 executes the action recognition result decision process based on the average speed of the segment acquired by the speed acquisition unit 332. Based on the average speed of the segment, the vehicle determination unit 334 determines whether a movement method is correct in the action content of the segment specified by the action recognition unit 330.

As described above, the action segment is represented by a start time and an end time of an action and action content and is acquired as an action recognition result by the action recognition unit 330. In the embodiment, whether the action recognition result by the action recognition unit 330 is correct is determined using the average speed of the section of the action segment acquired through the process of the speed acquisition unit 332 to improve precision of the action recognition result. Specifically, the vehicle determination unit 334 assumes that the section of the action segment obtained by the action recognition unit 330 (that is, the start time and the end time of the action) is correct and corrects the movement method of the action recognition result in accordance with the average speed acquired through the process of the speed acquisition unit 332.

Here, when there is an error in the action recognition result, the user may experience considerable discomfort. In particular, the discomfort is more considerable when a walking state is recognized as moving by bicycle, a still state is recognized as moving by vehicle, or moving by vehicle is recognized as a still state. The discomfort is more considerable than, for example, when a walking state is misrecognized as a running state, a running state is misrecognized as a walking state, a walking state is misrecognized as moving by vehicle, a walking state is misrecognized as a still state, and moving by bicycle is misrecognized as a walking state or a running state. Accordingly, in order to correct the action content when a walking state is misrecognized as moving by bicycle, a still state is misrecognized as moving by vehicle, or moving by vehicle is misrecognized as a still state, an example of a process of correcting the action recognition result is illustrated in FIG. 17.

In the example of the correction process illustrated in FIG. 17, the vehicle determination unit 334 first determines whether there are a plurality of pieces of valid positional information included in the section of the action segment (S120). A threshold of the number of pieces of valid positional information can be appropriately set by the system. In the embodiment, the number of pieces of valid positional information is determined to be plural (that is, two), but the present disclosure is not limited to this technology. For example, it may be determined whether the valid positional information is 0 or it may be determined whether the number of pieces of valid positional information is equal to or less than 2. When the threshold is set to be large, there is a high possibility of the action recognition result being given as a correct answer, but there is a high possibility of an error being ignored. The threshold of the number of pieces of valid positional information is decided in consideration of this fact. When it is determined in step S120 that the number of pieces of valid positional information is equal to or less than 1, the action recognition result by the action recognition unit 330 is followed (S129) and the process ends. Conversely, when there are a plurality of pieces of valid positional information, the vehicle determination unit 334 subsequently determines whether the average speed of the segment section is lower than a speed $V_1$ and the action content of the action recognition result by the action recognition unit 330 is moving by vehicle (S121).

In step S121, a state in which the user is in a vehicle and the still state are separated. The speed $V_1$ is set as a speed at which the user is unlikely to be considered to be in a vehicle and that is slow enough that the user can be regarded as being still. For example, the speed $V_1$ may be set to 0.5 km/h. When the average speed of the segment section is lower than the speed $V_1$ and the action content of the action recognition result by the action recognition unit 330 is moving by vehicle in step S121, the vehicle determination unit 334 corrects the action recognition result from the vehicle to the still state (S122).

Conversely, when it is determined in step S121 that the state is not the still state, the vehicle determination unit 334 determines whether the average speed of the segment section is lower than a speed $V_2$ and the action content of the action recognition result by the action recognition unit 330 is moving by bicycle (S123). In step S123, a state in which the user rides a bicycle and a walking state are separated. The speed $V_2$ has a greater value than the speed $V_1$ and is set as a speed at which the user is not likely to be considered to be riding a bicycle and that is slow enough that the user can be regarded to be walking. For example, the speed $V_2$ may be set to 3 km/h. When the average speed of the segment section is lower than the speed $V_2$ and the action content of the action recognition result by the action recognition unit 330 is moving by bicycle in step S123, the vehicle determination unit 334 sets the action recognition result from moving by bicycle to the walking state (S124).

Conversely, when it is determined in step S123 that the state is not the walking state, the vehicle determination unit 334 determines whether the average speed of the segment section is equal to or less than a speed $V_3$ (S125). The speed $V_3$ is set to have a greater value than the speed $V_2$. For example, the speed $V_3$ may be set to 8.5 km/h. Step S125 is a process of selecting a target on which processes (steps S126 and 128) of determining other vehicles to be described below are executed and a target for which the user is considered to be moving by a certain vehicle is extracted. When the average speed of the segment section is equal to or less than the speed $V_3$ in step S125, the vehicle determination unit 334 follows the action recognition result by the action recognition unit 330 (S129) and the process ends. Conversely, when the average speed of the segment section is greater than the speed $V_3$, the vehicle determination unit 334 determines whether the action content of the action recognition result by the action recognition unit 330 is moving without using a vehicle (S126).

When it is determined in step S126 that the action content of the action recognition result is moving without using a vehicle, the vehicle determination unit 334 determines that the action content of the action recognition result is moving by another vehicle (S127). Conversely, when it is determined in step S126 that the action content is moving by vehicle, the vehicle determination unit 334 determines whether the average speed of the segment section is faster than a speed $V_4$ and the action content of the action recognition result is moving by bicycle (S128). The speed $V_4$ is a value greater than the speed $V_3$ and a fast speed is set such that the user is unlikely to be considered to be riding a bicycle. For example, the speed $V_4$ may be set to 40 km/h.

When the average speed of the segment section is more rapid than the speed $V_4$ and the action content of the action recognition result is moving by bicycle in step S128, the vehicle determination unit 334 corrects the action recognition result from moving by bicycle to the moving by another vehicle (S127). Conversely, in other cases, the vehicle determination unit 334 follows the action recognition result by the action recognition unit 330 (S129) and the process ends.

When the average speed of the segment section is faster than the speed $V_4$ and the action content of the action recognition result is moving by bicycle in step S128, the vehicle determination unit 334 corrects the action recognition result from moving by bicycle to the moving by another vehicle (S127). Conversely, in other cases, the vehicle determination unit 334 follows the action recognition result by the action recognition unit 330 (S129) and the process ends.

[3.3. Action Log Presentation Process]

Returning to the description of FIG. 4, the user can manipulate the client terminal 100 to browse the action log of the user. At this time, the user transmits action log request information in which the action log is acquired from the input unit 140 of the client terminal 100 to the analysis server 300 (S40). The action log request information includes the user ID of the user and a message for requesting presentation of the action log.

The analysis server 300 receiving the action log request information causes the control unit 320 to acquire the corresponding action log of the user from the action log DB and transmits the action log of the user to the client terminal 100 (S50). The client terminal 100 receiving the action log causes the display processing unit 150 to represent the content of the action log in accordance with a UI and causes the display unit 160 to display the content of the action log (S60). For example, as illustrated in FIG. 2, the content of the action log is displayed on the display unit 160 of the client terminal 100.

[3.4. Action Log Correction Process by User]

The content of the action log displayed on the client terminal 100 in step S60 can be corrected by the user in accordance with an action correction screen (S70). As cases in which the content of the action log is corrected, for example, there are not only a case in which the action recognition result by the action recognition processing unit is erroneous but also a case in which display of more detailed action display is desired. For example, there is a case in which even moving by a certain vehicle is desired to be displayed when the content of the displayed action log is "moving by (certain) vehicle."

Figure 18:
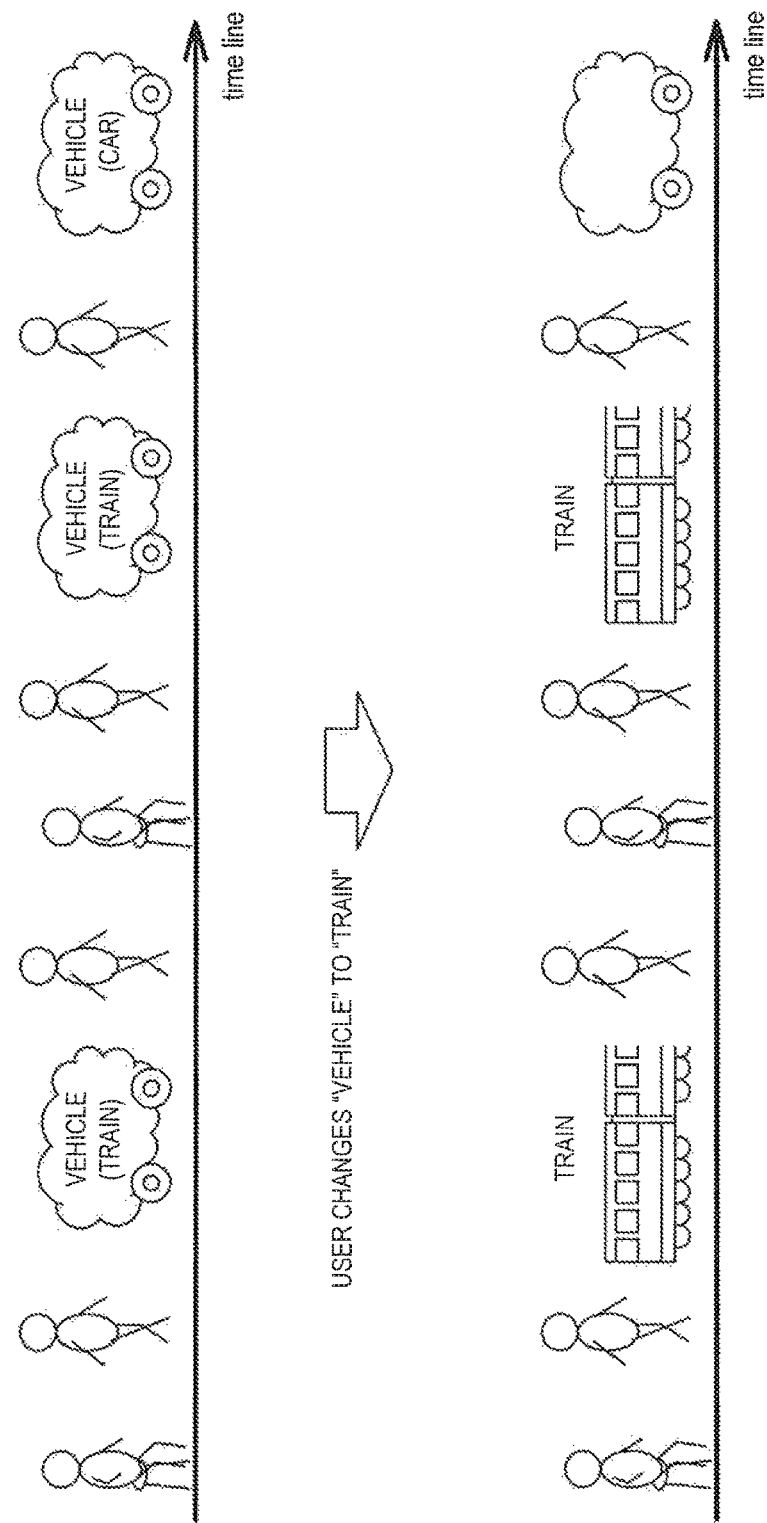
FIG. 18 is an explanatory diagram illustrating a process of changing the action recognition result to detailed action content.

For example, as illustrated on the upper side of FIG. 18, when an action recognition result object indicating "moving by vehicle" is displayed, there is a case in which even moving by a certain vehicle is recognized in the action recognition result of the action recognition unit 330. In the three times "moving by vehicle" is recognized as illustrated on the upper side of FIG. 18, moving by train is assumed to be recognized twice and moving by car is assumed to be recognized once. Here, when the user corrects the action recognition result which is "moving by vehicle" to "moving by train" and moving by train is also obtained as the action recognition result, as illustrated on the lower side of FIG. 18, "moving by train" is subsequently displayed as action recognition of moving by train. The content which is "moving by car" not corrected by the user is displayed as "moving by vehicle."

Figure 19:
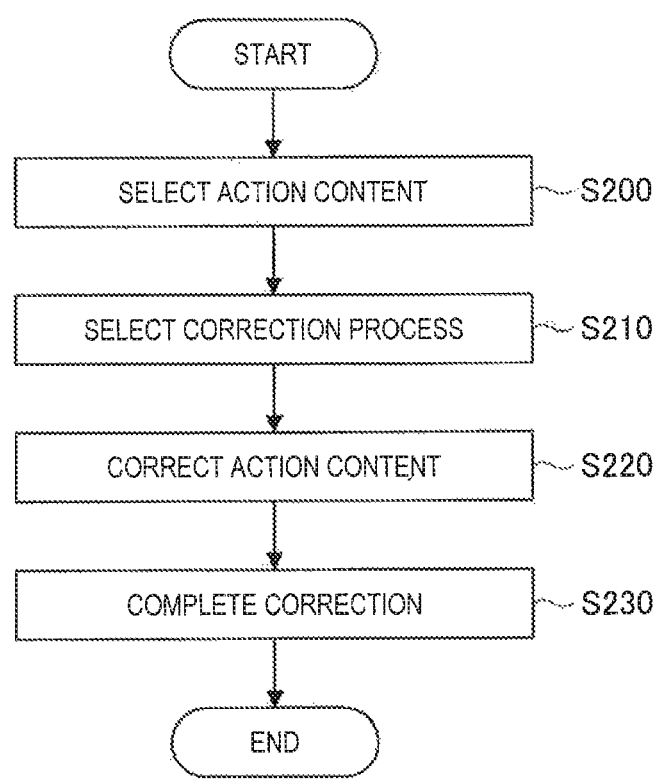
FIG. 19 is a flowchart illustrating an action log correction process by a user.
Figure 20:
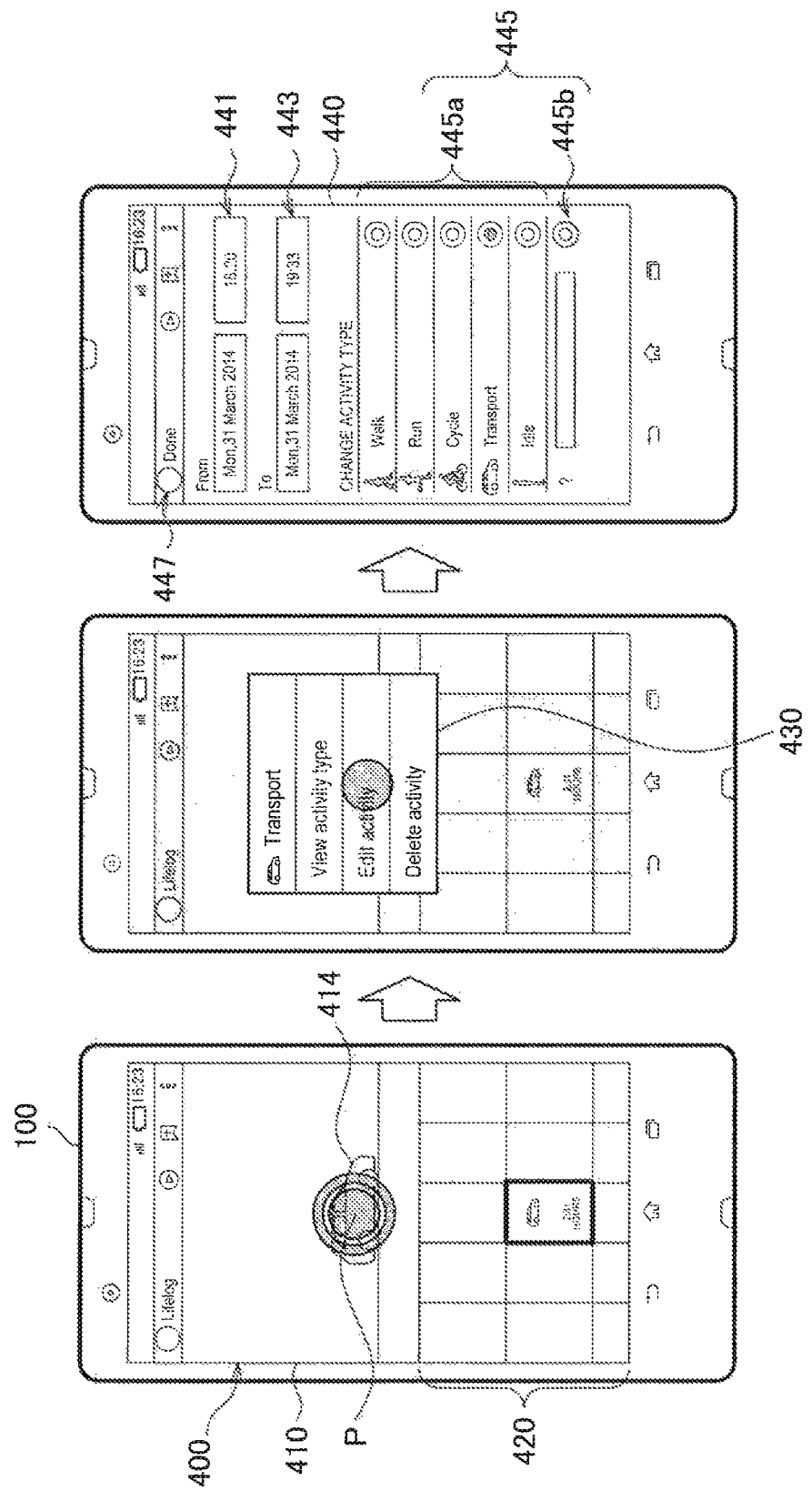
FIG. 20 is an explanatory diagram illustrating a manipulation of the action log correction process by the user.

An example of the action log correction process by the user will be described with reference to FIGS. 19 and 20. FIG. 19 is a flowchart illustrating an action log correction process by the user. FIG. 20 is an explanatory diagram illustrating a manipulation of the action log correction process by the user.

When the user corrects the action log, as illustrated in FIG. 19, the user first selects the action content to be corrected (S200) and displays an action correction screen to correct the action content (S210). The content to be corrected can be selected in step S200 by tapping an action recognition result object 414 displayed in an action display region 410 of an action log display screen 400 displayed on the display unit 160 of the client terminal 100, as illustrated on the left side of FIG. 20. In a display region of the display unit 160, a touch panel capable of detecting a touch or an approach of a manipulator such as a finger is assumed to be included in the input unit 140.

The control unit 120 may display a tap display object on the display unit 160 so that a tapped position P can be viewed. When the action recognition result object 414 is detected to be tapped, the control unit 120 instructs the display processing unit 150 to display a process selection screen 430 and allows the user to select a process to be executed on the action content of the action recognition result object 414. In the process selection screen 430, for example, as illustrated in the middle of FIG. 20, a process such as detailed information browsing of the action content, editing such as correction of the action content, or deletion of the action content can be selected. When the user corrects the action content, the user taps and selects the process of editing the action content from the process selection screen 430, and the process is displayed in an action correction screen 440.

When the action correction screen 440 is displayed on the display unit 160, the user inputs correction content to correct the action content in the action correction screen 440 (S220). In the action correction screen 440, for example, as illustrated on the right side of FIG. 20, there are a start time input region 441, an end time input region 443, and an action content input region 445 of the action log (the action segment). The user inputs content after the correction to the input regions of the content desired to be corrected to correct the action log.

Here, as illustrated on the right side of FIG. 20, the action content input region 445 may be configured to include a preset input region 445a in which the changeable action content is displayed as correction candidates and a direct input region 445b in which the user can directly input the action content. In the preset input region 445a, buttons associated with the action content such as "walking," "running," "moving by bicycle," "moving by another vehicle", and "still" can be selected to correct the action content. When no action content desired to be corrected is present in the preset input region 445a, the user can also directly input action content into the direct input region 445b to correct the action content.

When the user ends the correction of the action content, the user taps a completion button 447 to reflect the correction content input into the action correction screen 440 to the action log and completes the correction process (S230). In this way, the user can easily correct the action recognition result in the action correction screen 440.

[3.5. Personalization Learning Process Based on Correction Information]

As described above, when the action content is corrected by the user, actions unique to each user can be reflected in the action recognition process using the correction information, thereby improving the precision of the action recognition result (S80). That is, by executing personalization learning of the action recognition result based on the correction information, it is possible to present the action log suitable for each user.

Figure 25:
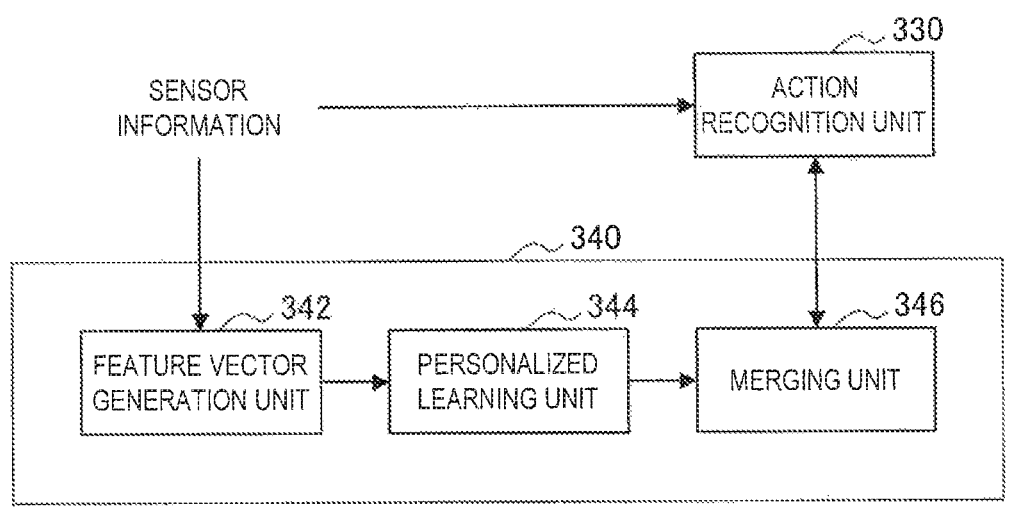
FIG. 25 is a block diagram illustrating functional units of a correction unit executing the action recognition result decision process in which the personalized model is considered.
Figure 26:
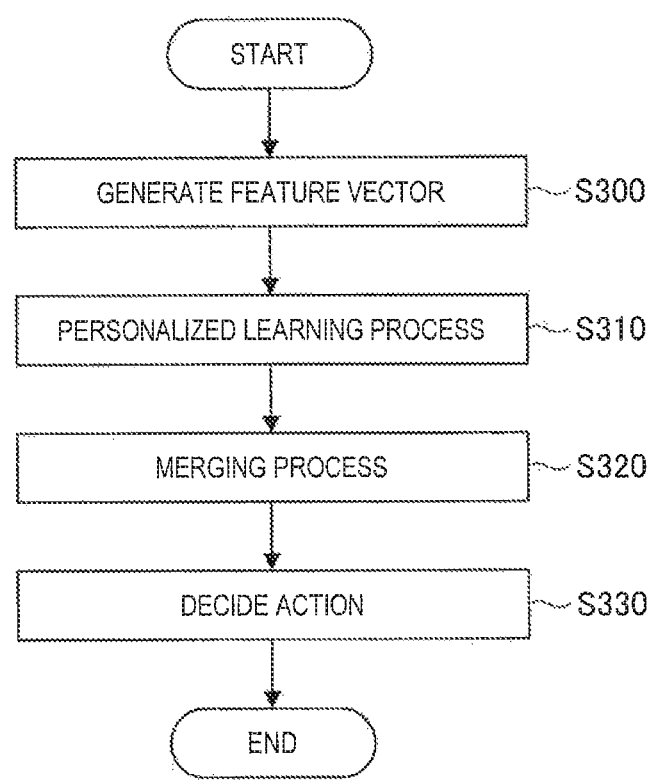
FIG. 26 is a flowchart illustrating the action recognition result decision process in which the personalized model is considered in the correction unit.
Figure 27:
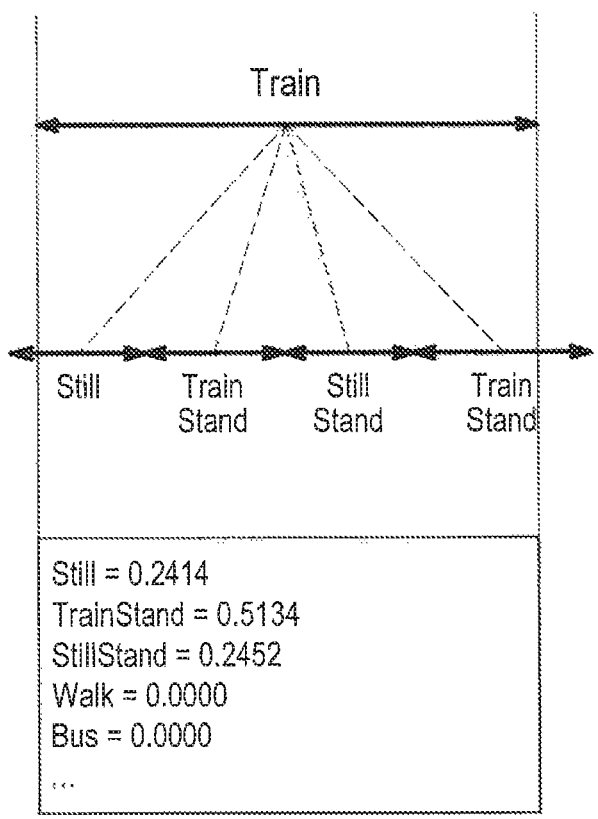
FIG. 27 is an explanatory diagram illustrating an example of a feature vector in regard to UnitAct.
Figure 28:
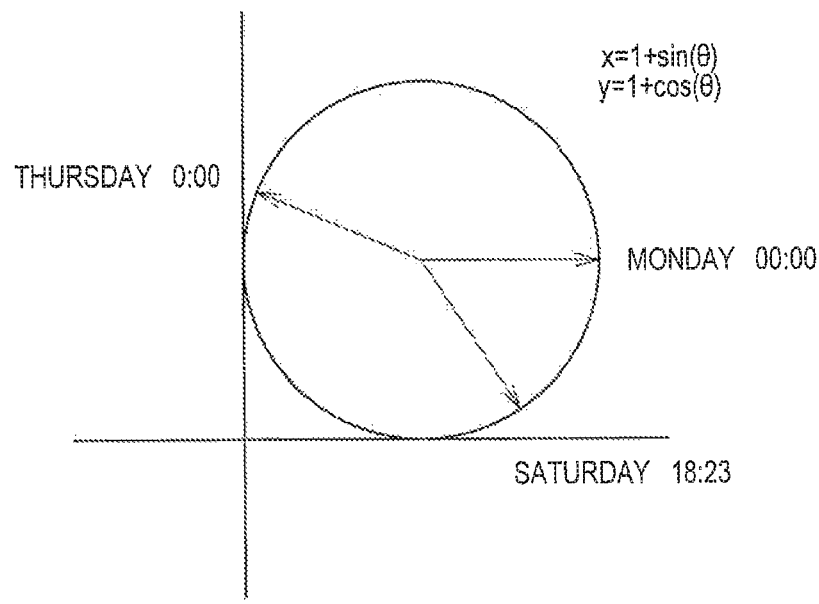
FIG. 28 is an explanatory diagram illustrating an example of a feature vector in regard to day-of-week information.
Figure 29:
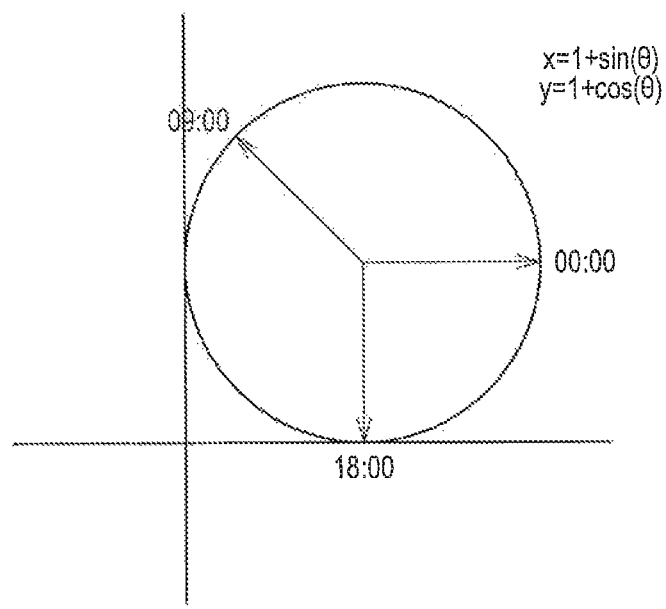
FIG. 29 is an explanatory diagram illustrating an example of a feature vector in regard to time information.
Figure 30:
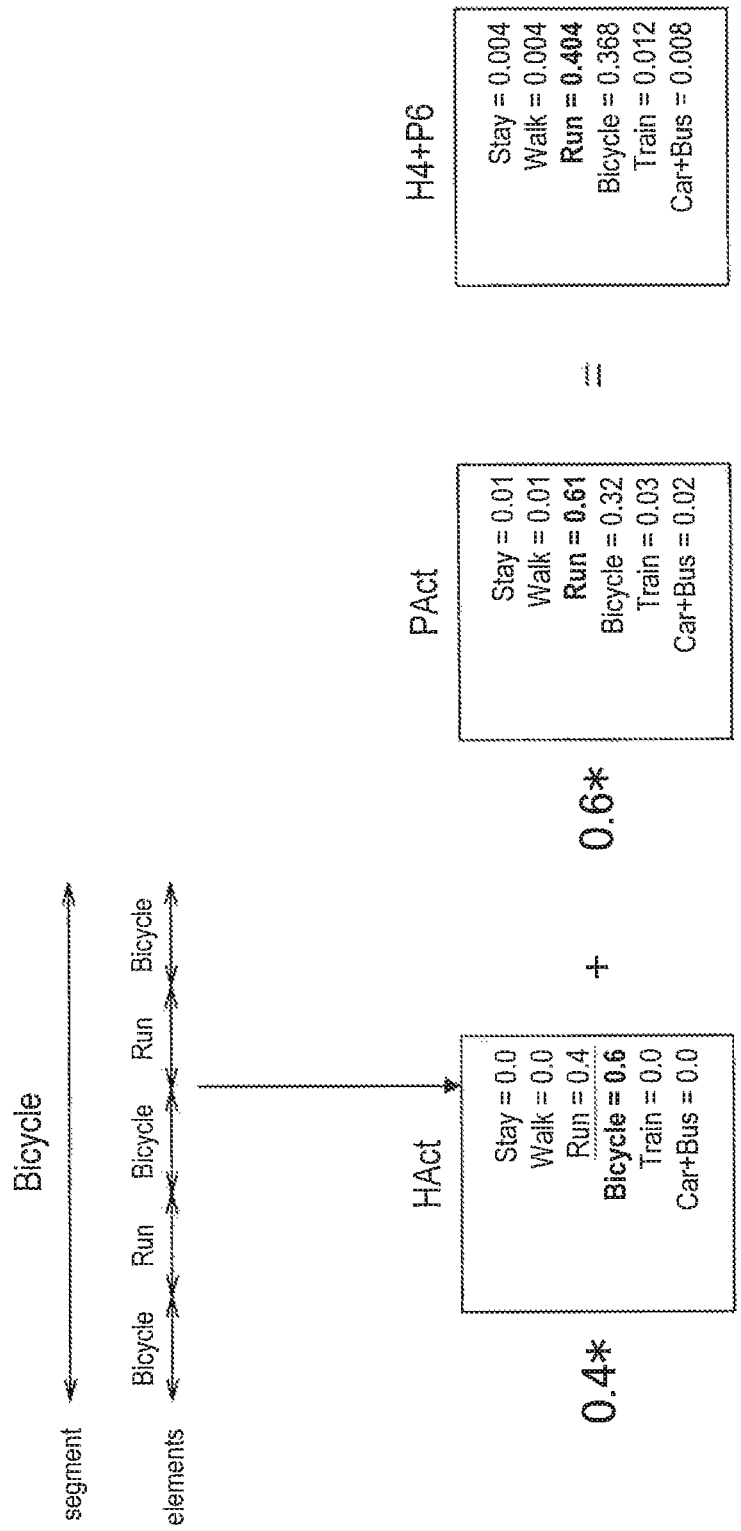
FIG. 30 is an explanatory diagram illustrating an action recognition result merging process.
Figure 31:
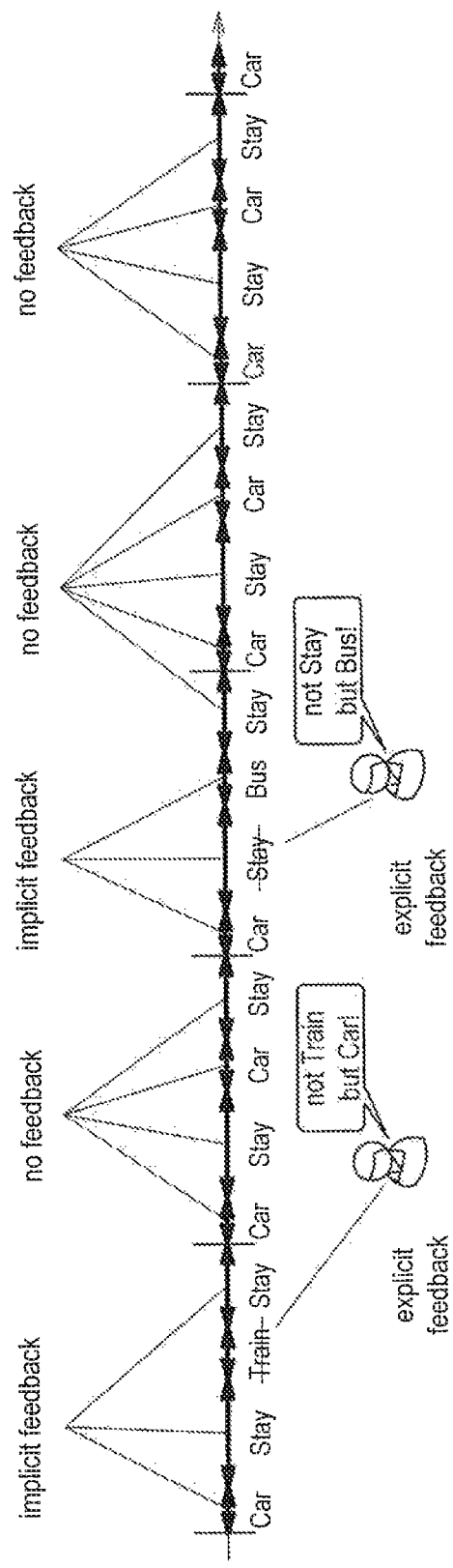
FIG. 31 is an explanatory diagram illustrating an example of selection condition setting of an action segment used for personalization learning.

Hereinafter, the personalization learning process based on the correction information will be described with reference to FIGS. 21 to 31. FIGS. 21 to 24 are explanatory diagrams illustrating an overview of the personalization learning process based on the correction information. FIG. 25 is a block diagram illustrating functional units executing the personalization learning process. FIG. 26 is a flowchart illustrating the action recognition result decision process in which a personalized model is considered in the correction unit 340. FIGS. 27 to 29 are explanatory diagrams illustrating a feature vector. FIG. 30 is an explanatory diagram illustrating an action recognition result merging process. FIG. 31 is an explanatory diagram illustrating an example of selection condition setting of an action segment used for personalization learning.

(1) Overview

Figure 21:
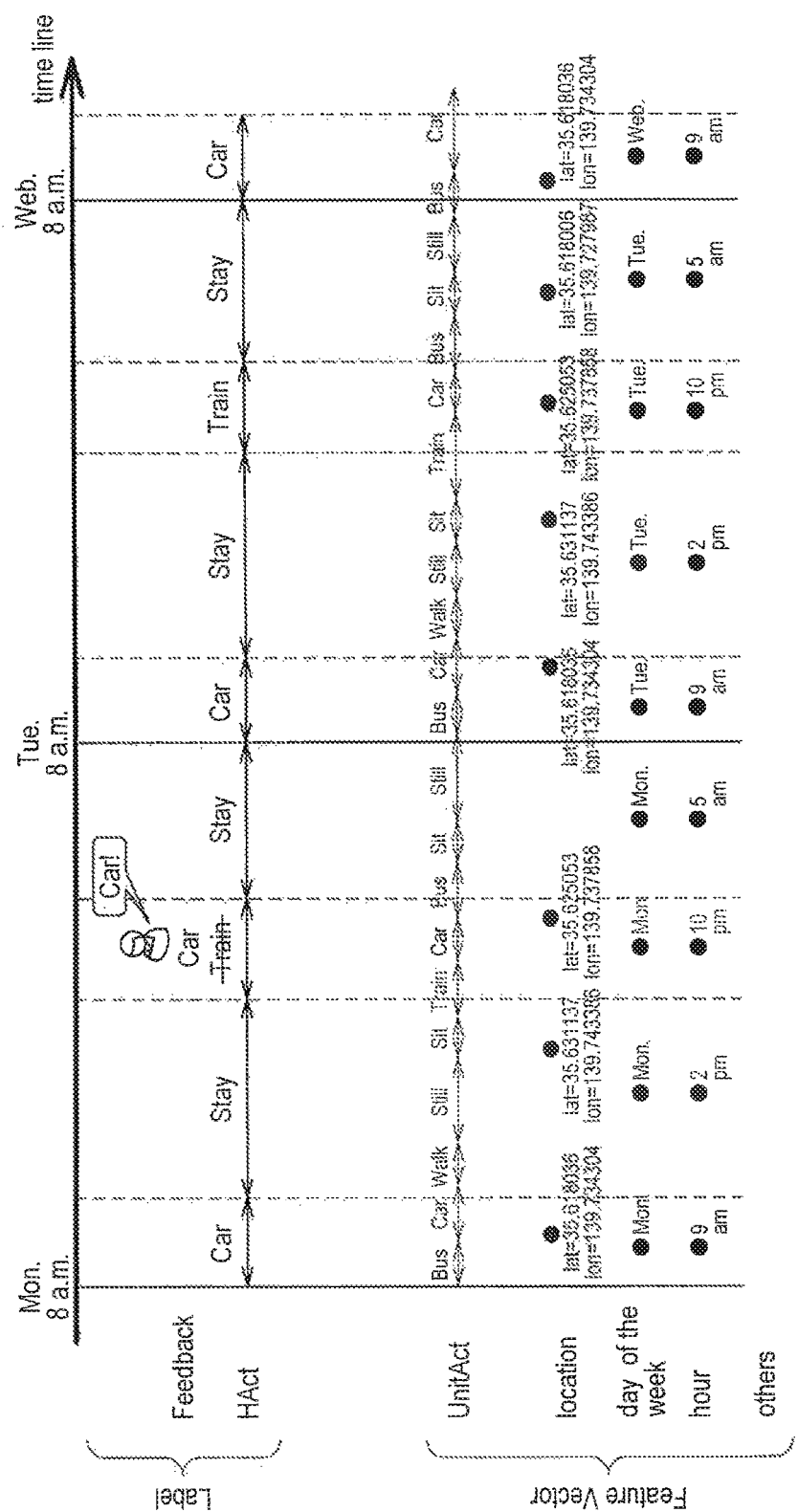
FIG. 21 is an explanatory diagram illustrating an overview of a personalization learning process based on correction information.

First, an overview of the personalization learning process using the correction information of the action recognition result by the user will be described. FIG. 21 illustrates an example of the action recognition result by the action recognition unit 330. In FIG. 21, an action log of a certain user from 08:00 a.m. Monday to 08:00 a.m. Wednesday is illustrated. Here, as label information which can be recognized by the user, there are action content (HAct) of the action segment and correction information (Feedback) from the user. As internal information, there is feature vector information which is used to acquire the action segment through the action recognition process. As the feature vector information, for example, there are an action recognition result (UnitAct), positional information (location), a day of the week (day of week), and a time (hour) for each unit time acquired by the action recognition process. Further, other information (others) such as an application activated in the client terminal 100 in the weather at that time can also be used as a feature vector.

Figure 22:
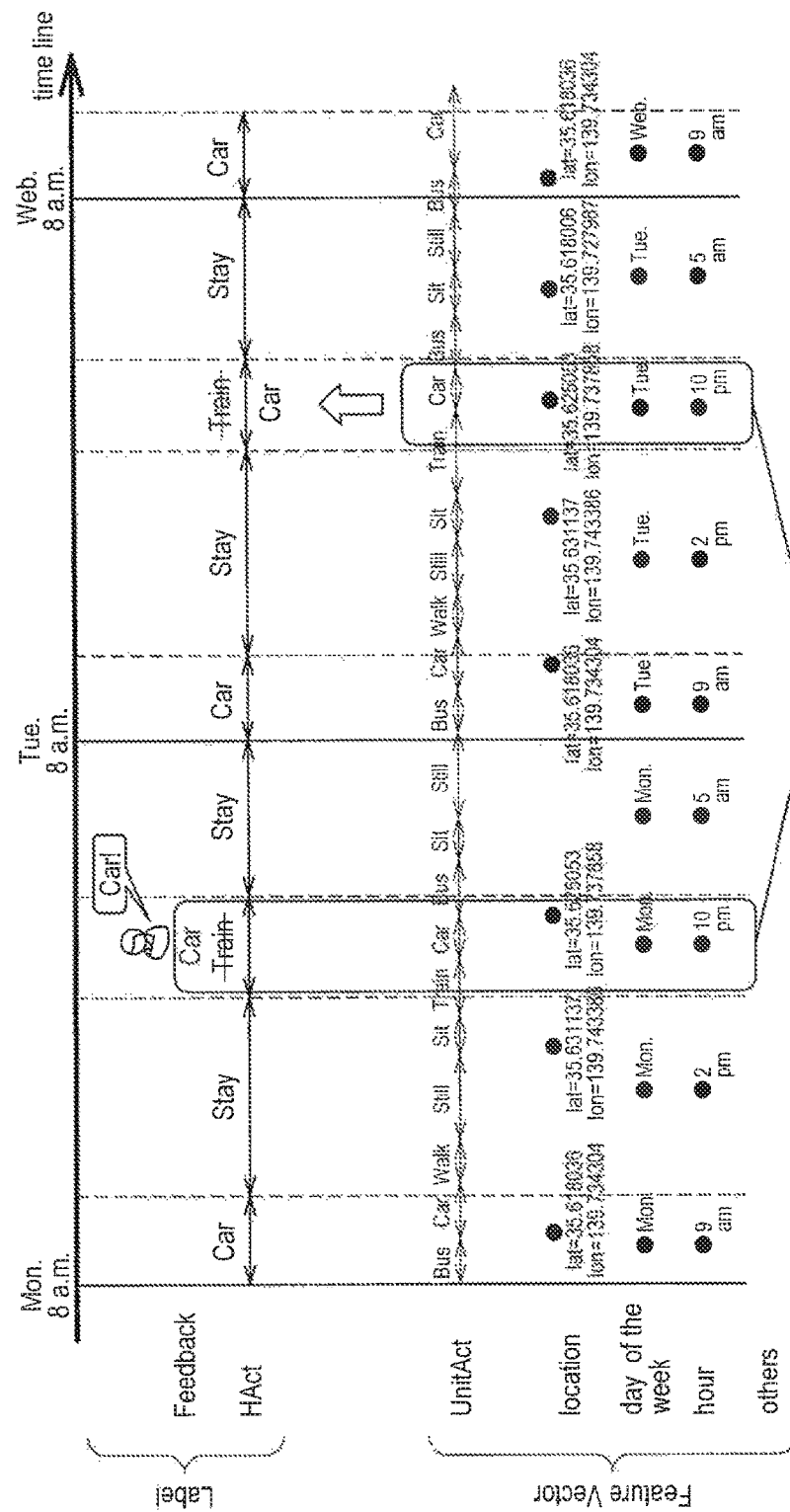
FIG. 22 is an explanatory diagram illustrating a state in which the correction content of an action segment of FIG. 22 is reflected.

Here, the user is assumed to correct the action content of the action segment at 10:00 p.m. on Monday from "moving by train" to "moving by car." When the correction information is received, the correction unit 340 executes personalization learning of the user, and subsequently the action recognition based on the correction content is executed on the same action content in the same action pattern. As illustrated in FIG. 22, the action content recognized as "moving by train" at from 10:00 p.m. on Tuesday and thereafter is corrected to "moving by car" in accordance with the correction information in FIG. 21.

Figure 23:
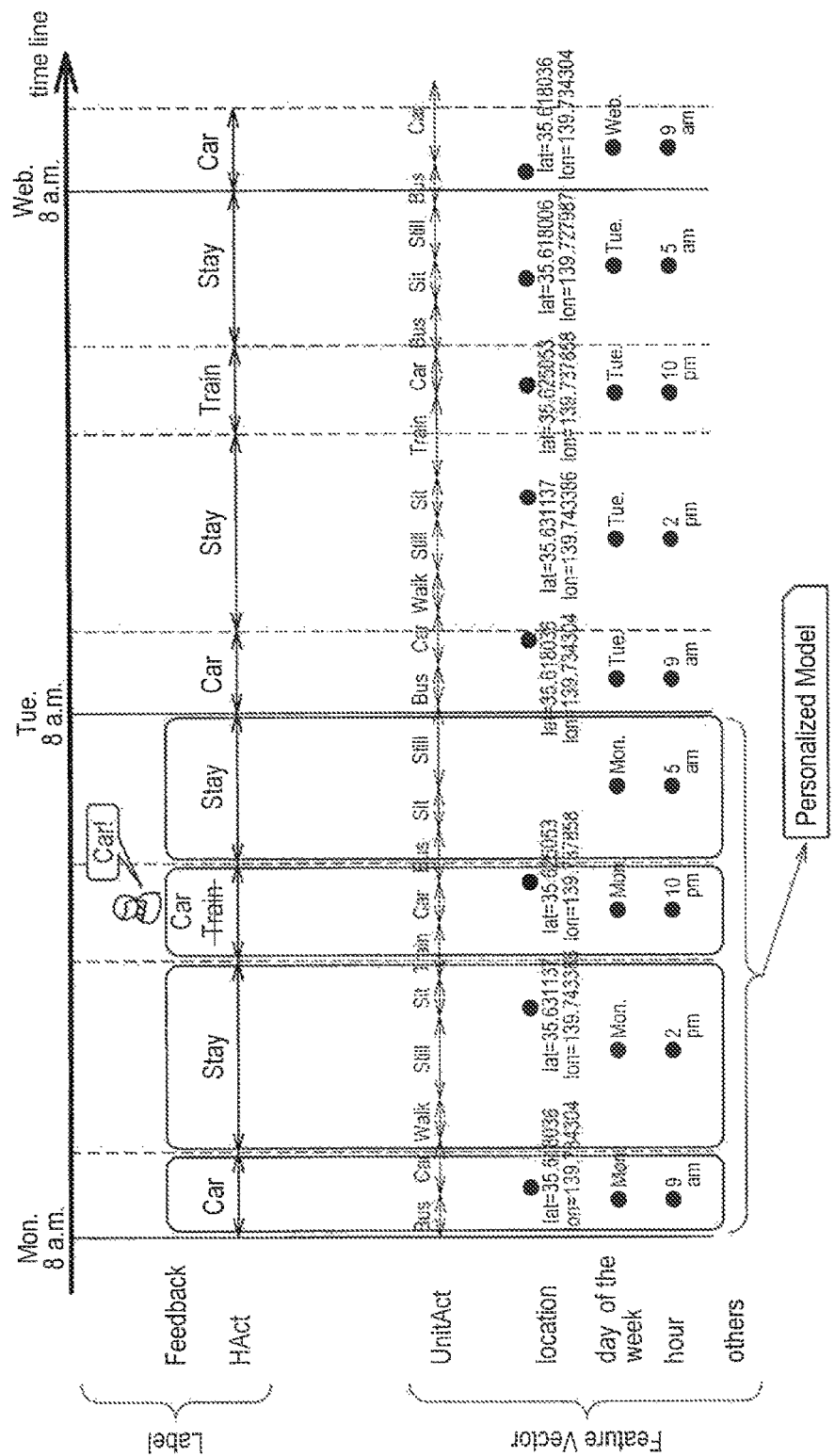
FIG. 23 is an explanatory diagram illustrating an overview of a personalized model generation process.
Figure 24:
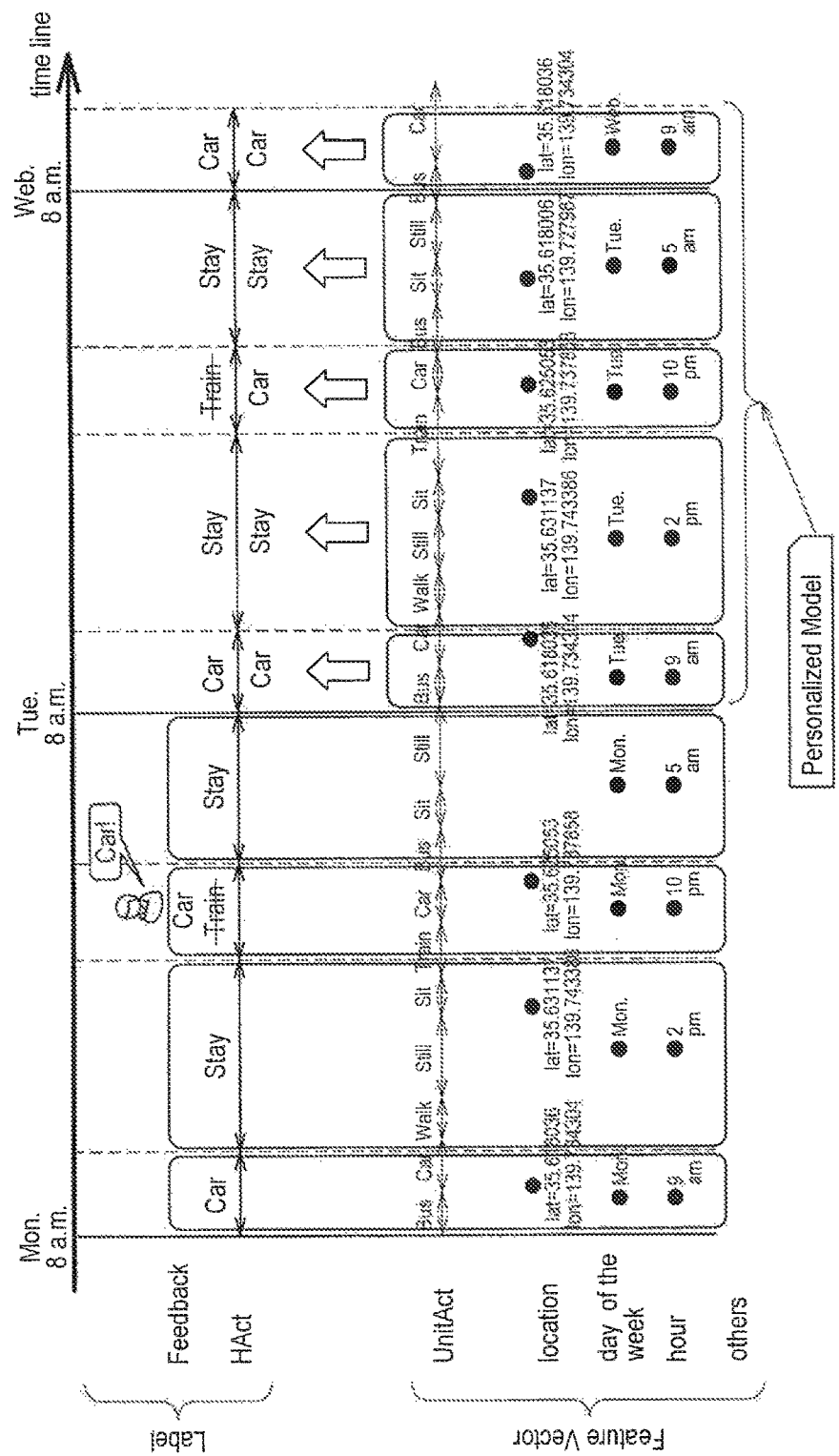
FIG. 24 is an explanatory diagram illustrating an action recognition result decision process in which a personalized model of FIG. 23 is considered.

The personalization learning by the correction unit 340 will be described in detail. As illustrated in FIG. 23, the correction unit 340 first generates a personalized model specialized for the user using the label information and the feature vector information of each action segment during a predetermined period (for example, one day) as teacher data. Then, the correction unit 340 corrects the action content of each action segment for the subsequent predetermined period based on the generated personalized model and the feature vector information during that period. Thus, it is possible to recognize the action content unique to each user.

(2) Functional Configuration

FIG. 25 illustrates functional units of the correction unit 340 executing the personalized learning process. As illustrated in FIG. 25, the correction unit 340 includes a feature vector generation unit 342, a personalized learning unit 344, and a merging unit 346.

The feature vector generation unit 342 generates feature vector information which is used to generate a personalized model. The feature vector generation unit 342 generates the feature vector information from the action recognition result (UnitAct), the positional information (location), the day of the week (day of week), the time (hour), and weather for each unit time and the other information (others) such as an application activated in the client terminal 100. The details of a process of generating the feature vector information will be described below.

The personalized learning unit 344 executes learning based on the feature vector information generated by the feature vector generation unit 342 and generates the personalized model of each user. The personalized learning unit 344 generates the personalized model in accordance with a learning technique such as linear SVM, SVM (RBF Kernel), kNN, Naive Bayes, Decision Tree, Random Forest, or AdaBoost. For example, when linear SVM is used, a calculation amount is also small and the personalized model can be generated.

The merging unit 346 merges the action recognition result acquired based on the personalized model generated by the personalized learning unit 344 and the action recognition result acquired by the action recognition unit 330 and decides a final action recognition result. For example, the merging unit 346 linearly combines the action recognition result acquired based on the personalized model and the action recognition result acquired by the action recognition unit 330 at a predetermined weight and sets an action recognition result with a maximum score as the final action recognition result.

(3) Action Recognition Result Decision Process Considering Personalized Model

An action recognition result decision process in which the personalized model is considered by the correction unit 340 will be described with reference to FIG. 26. The feature vector generation unit 342 of the correction unit 340 first generates the feature vector information which is used to generate the personalized model of each user (S300). The feature vector generation unit 342 generates the feature vector from the following information.

UnitAct Histogram

A UnitAct which is the action recognition result at each unit time is information which is acquired by the action recognition unit 330 and the action content of the action segment is decided at a time rate of the UnitAct within the segment section. The UnitAct represents the plurality of pieces of action content and represents, for example, the following action content:

"moving by bicycle (Bicycle)", "moving by bus (Bus)";
"sitting on bus (BusSit)";
"standing on bus (BusStand)";
"moving by car (Car)" and "moving down in elevator (ElevDown)";
"moving up in elevator (ElevUp)" and "jumping (Jump)";
"NotCarry," "running (Run)," and "still (Still)";
"sitting still (StillSit)," and "standing still (StillStand)";
"moving by train (Train)" and "sitting on train (TrainSit)"; and
"standing on train" and "walking (Walk)."

The action content represented by the UnitAct is not limited to the following content, but more action content may be specified. For example, moving, moving up, and moving down by escalator, ropeway, cable car, motorcycle, ship, airplane, and the like may be specified as the action content related to the above-described movements. In addition to the movement actions, for example, non-movement actions such as eating, talking on the telephone, watching television or a video, a manipulation on music in a mobile communication terminal such as a smartphone, and sports (tennis, skiing, fishing, and the like) may be specified.

The feature vector generation unit 342 requests time rates from a plurality of UnitActs included in the action segment, executes normalization so that a sum of the time ratios of the UnitActs of the action segment is 1.0, and sets the normalized result as a feature vector. For example, as illustrated in FIG. 27, an action segment of action content "moving by train (Train)" is assumed to include three pieces of action content, the UnitActs of three pieces of content, "still (Still)," "standing on train (TrainStand)," and "standing still (StillStand)." At this time, the feature vector generation unit 342 calculates the time rate of each UnitAct of the action segment and executes normalization.

In the example of FIG. 27, values, 0.2414 of "still (Still)," 0.5134 of "standing on train (TrainStand)," and 0.2452 of "standing still (StillStand)," are calculated. These values are used as feature vectors. A value of a feature vector of action content of a UnitAct not included in the action segment is 0.

Positional Information

The feature vector related to the positional information may be set based on latitude and longitude information in the action segment. For example, an average value of the latitude and longitude information in the action segment may be set as the feature vector related to the positional information. Alternatively, the average value of the latitude and longitude information of each user may be set as a feature vector, clustering may be executed using, for example, a technique such as a k-means method, and a k-dimensional feature vector may be generated by a 1-of-k expression of an id of each cluster. By using a result of the clustering as the feature vector, it is possible to represent a place that the user frequently visits (for example, "house," "company," "supermarket") by the k-dimensional feature vector.

Movement Information

A movement vector representing a movement direction or a movement amount of the user may be set as a feature vector using the positional information in the action segment. For example, a 3-dimensional feature vector can be generated from the movement direction and the movement amount.

Time Length of Segment

A time length (hour) of the segment may be set as 1-dimensional feature amount.

Day-of-Week Information

A day of the week on which the action content of the action segment is executed may be set as feature vector. For example, a sine value and a cosine value of a circle in which the days of the week, 7 days, are one round may be set as feature vectors (each of which is 2-dimensional). At this time, as illustrated in FIG. 28, a time on each day of the week can be represented by, for example, an x coordinate (1+sin θ) and a y coordinate (1+cos θ) of a circle in which a radius is 1 centering on (x, y)=(1, 1). For example, 00:00 a.m. on Monday is represented by (x, y)=(1+sin 0°, 1+cos 0°).

Alternatively, the 7 days from Sunday to Saturday may be represented as a 7-dimensional feature vector by the 1-of-K expression. Further, both weekdays and holidays may be represented as a 2-dimensional feature vector by the 1-of-K expression.

Time Information

Each time at which the action content of the action segment is executed may be set as a feature vector. For time information, as in the day-of-week information, for example, a sine value and a cosine value of a circle in which 24 hours is one round may be set as feature vectors (each of which is 2-dimensional). At this time, as illustrated in FIG. 29, each time can be represented by, for example, an x coordinate (1+sin θ) and a y coordinate (1+cos θ) of a circle in which a radius is 1 centering on (x, y)=(1, 1). For example, 18:00 is represented by (x, y)=(1+sin 270°, 1+cos 270°). Alternatively, 24 hours from 00:00 to 23:00 may be represented as a 24-dimensional feature vector by the 1-of-K expression.

Other Feature Vectors

In addition to the above-described information, a feature vector may be set using measurable information in which a different situation emerges depending on an individual person. For example, weather at the time an action is executed may be set as a feature vector. By weather information, for example, a feature of an action, moving by bus during rain and walking under clear skies, can be recognized. Alternatively, a feature of the action can also be recognized by an application activated with the client terminal 100 or music being listened to when the user executes an action.

The feature vector generation unit 342 generates the feature vector information based on such information. When the feature vector information is generated, the personalized learning unit 344 generates the personalized model to recognize a feature action of each user through a personalized learning process (S310). The personalized learning unit 344 generates the personalized model in accordance with the learning technique such as linear SVM, SVM (RBF Kernel), kNN, Naive Bayes, Decision Tree, Random Forest, or AdaBoost, as described above.

Thereafter, the merging unit 346 merges the action recognition result acquired based on the personalized model generated by the personalized learning unit 344 and the action recognition result acquired by the action recognition unit 330 (S320) and decides a final action recognition result (S330). For example, the merging unit 346 linearly combines an action recognition result (PAct) acquired based on the personalized model and an action recognition result (HAct) acquired by the action recognition unit 330 at a predetermined weight a as in the following Equation (1) and obtains an action recognition result (Merge) in which the personalized model is considered.

$$\text{Merge} = H\text{Act} \times a + P\text{Act} \times (1-a) \quad (1)$$

At this time, action recognition result (HAct) and the action recognition result (PAct) are normalized and are configured to be evaluated equally. For the action recognition result (HAct) acquired by the action recognition unit 330, for example, the normalization may be executed so that the length of an element (a result at each minute) included in the action segment is 1.0. For the action recognition result (PAct), for example, a distance up to a hyperplane of SVM may be normalized using 0 as a minimum value and using 1 as a maximum value when SVM is used as the learning technique. The weight a used to linearly combine the action recognition results can be appropriately set and may be set to, for example, 0.4.

FIG. 30 illustrates an example of the merging process by the merging unit 346. In FIG. 30, a result of "moving by bicycle (Bicycle)" is obtained as the action recognition result of the action segment by the action recognition unit 330. The action segment is formed by two elements, "moving by bicycle (Bicycle)" and "running (Run)," and each score is decided by a time rate in the action segment. This content is the action recognition result (HAct). In the example of FIG. 30, "moving by bicycle (Bicycle)" has a maximum score in the action recognition result (HAct).

On the other hand, "running (Run)" has a maximum score in the action recognition result (PAct) based on the personalized model. When the action recognition result (HAct) and the action recognition result (PAct) are merged based on the foregoing Equation (1) using 0.4 as a weight in order to reflect an action unique to each user, the action content of the maximum score of the action recognition result (Merge) in which the personalized model is considered is "running (Run)." In this way, the action content not specified in the action recognition result (HAct) in which the action unique to the user is not considered is the final action result.

In this way, by causing the correction unit 340 to reflect the action unique to each user in the action recognition process using the correction information, it is possible to improve the precision of the action recognition result.

(4) Filter Process Related to Feedback of Correction Information

When the action unique to each user is reflected in the action recognition process using the correction information of the action content by the user, the precision of the action recognition result is improved. However, a filter may be applied to the correction information to be fed back so that the correction information further intended by the user is reflected.

In the process of merging the action recognition result (HAct) and the action recognition result (PAct), the action unique to the user can be reflected in the action recognition process. For example, when the number of learning samples of the personalized model is small, the precision is less than the precision of an action recognition result of only the action recognition result (HAct). Accordingly, only correction information of a pattern previously corrected by the user may be reflected.

For example, the correction information by a certain user is assumed to be "moving by car" from "moving by train." At this time, when the action recognition result (HAct) is "moving by train" and the action recognition result (Merge) in which the personalized model is considered is "moving by car" at the time of prediction of a future section, the correction information passes through this filter and the final action recognition result is assumed to be "moving by car." Conversely, when the action recognition result (HAct) is "walking" and the action recognition result (Merge) in which the personalized model is considered is "moving by car," the correction information does not pass through this filter and the final action recognition result is assumed to be "walking."

By applying the filter to the correction information to be fed back, a result 26 equivalent to the capability of the action recognition result (HAct) can be output in a pattern which has not been corrected even once by the user and a result is output considering the personalized model in a pattern which has been corrected. Such results are also convincing results from the viewpoint of an experience of the user.

In the filter process for the correction information to be fed back, the action recognition result (Merge) in which the personalized model is considered in the correction executed once previously in the pattern may be used. Alternatively, when the number of corrections executed previously in a pattern of the same content exceeds a predetermined number (for example, three times), the action recognition result (Merge) in which the personalized model is considered may be used.

The action recognition result presented to the user may not necessarily be confirmed by the user and may not necessarily be corrected appropriately by the user. For example, the user may not input correction information of action content without confirming the action recognition result in some cases. At this time, the correction unit 340 may use only information of a predetermined section in which correction information is input by the user in learning of the personalized model. For example, as illustrated in FIG. 31, presence or absence of the correction information is examined for each predetermined section (for example, one day) and learning of a personalized model is executed using only information of the action segment of a section in which the correction information is input at least once. Thus, the action content intentionally corrected by the user can be regarded as the action unique to the user to be reflected appropriately in the personalized model.

4. CONCLUSION

The configuration of the action log display system and the process of the system according to the embodiment have been described above. In the action log display system according to the embodiment, the determination process is executed so that the content of the action log presented to the user is more correct, the action log is further corrected by the user, and the corrected action log is reflected in a subsequent action recognition process. Thus, it is possible to present the action log with the correct content to the user according to an intention of the user.

5. EXAMPLE OF HARDWARE CONFIGURATION

Figure 32:
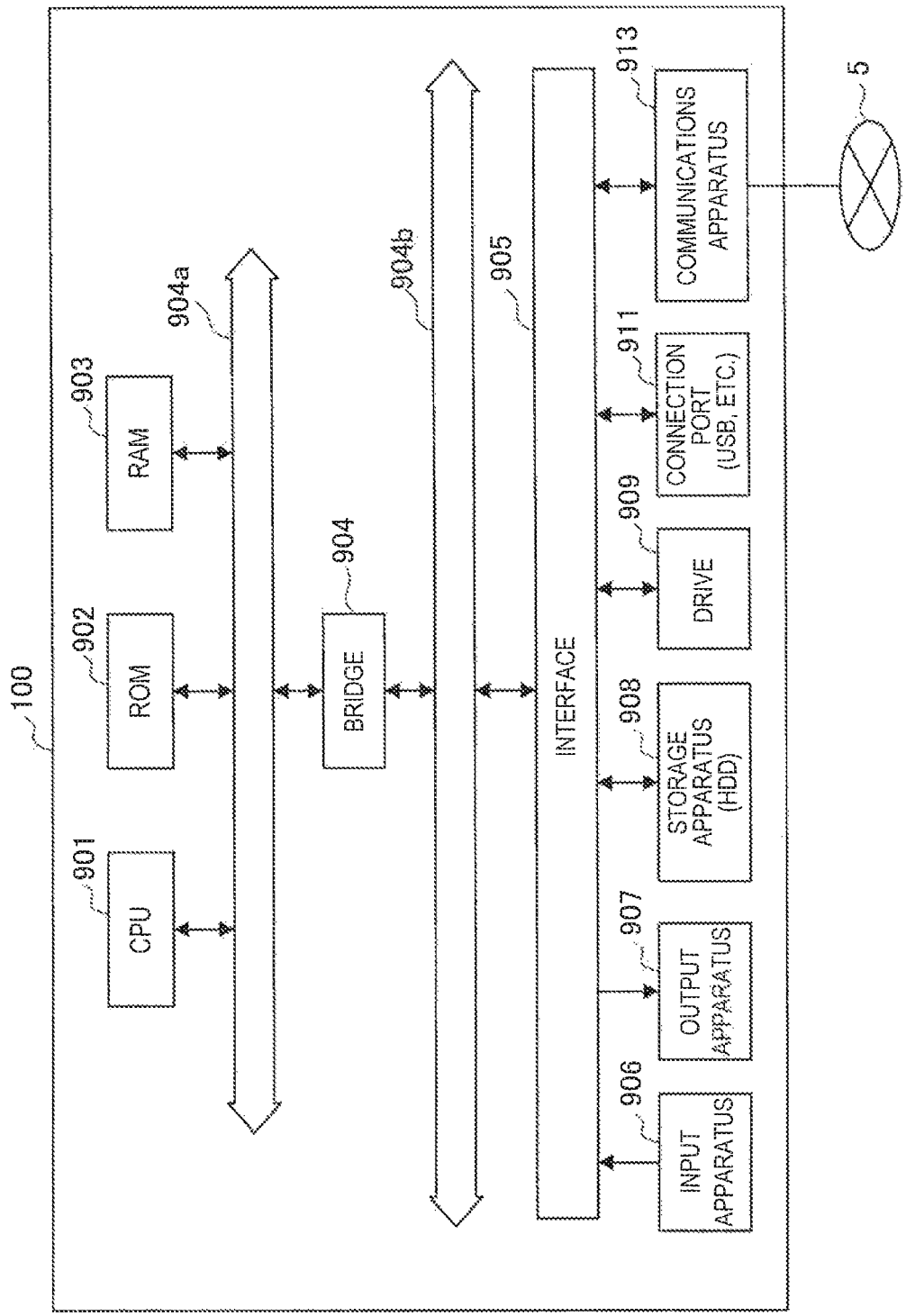
FIG. 32 is a hardware configuration diagram illustrating a hardware configuration of a client terminal according to the embodiment.

Finally, an example of hardware configurations of the client terminal 100, the log server 200, and the analysis server 300 according to the embodiment will be described. Since these devices can be configured similarly, the client terminal 100 will be described as an example. FIG. 32 is a hardware configuration diagram illustrating a hardware configuration of the client terminal 100 according to the embodiment.

The client terminal 100 according to the present embodiment, as described above, can be implemented from a processing apparatus such as a computer. The client terminal 100, as shown in FIG. 32, includes a CPU (Central Processing Unit) 901, a ROM (Read Only Memory) 902, a RAM (Random Access Memory) 903, and a host bus 904*a*. Further, the client terminal 100 includes a bridge 904, an external bus 904*b*, an interface 905, an input apparatus 906, an output apparatus 907, a storage apparatus 908, a connection port 911, and a communications apparatus 913.

The CPU 901 functions as an arithmetic processing apparatus and a control apparatus, and controls all the operations within the client terminal 100 according to various programs. Further, the CPU 901 may be a microprocessor. The ROM 902 stores such things as programs used by the CPU 901 and arithmetic parameters. The RAM 903 temporarily stores such things as programs used for the execution of the CPU 901, and parameters arbitrary modified for these executions. These are mutually connected by the host bus 904*a* composed of a CPU bus.

The host bus 904*a* is connected to the external bus 904*b*, such as a PCI (Peripheral Component Interconnect/Interface) bus, through the bridge 904. Note that it is not necessary to separately configure the host bus 904*a*, bridge 904, and external bus 904*b*, and these functions may be implemented on one bus.

The input apparatus 906 generates an input signal based on the input from a user and an input mechanism for the user to input information, such as a mouse, keyboard, touch panel, button, microphone, switch or the like, and includes an input control circuit which outputs to the CPU 901. The output apparatus 907, for example, includes a display device, such as a liquid crystal display (LCD) device, an OLED (Organic Light Emitting Diode) device or a lamp, and a voice output apparatus, such as a speaker.

The storage apparatus 908 is an example of a storage section of the client terminal 100, and is an apparatus for data storage. The storage apparatus 908 may include a storage medium, a recording apparatus which records data to the storage medium, and an erasure apparatus which erases data recorded in a reading apparatus reading data from the storage medium, and the storage medium. This storage apparatus 908 drives a hard disk, and stores programs executed by the CPU 901 and various data.

The drive 909 is a reader/writer for the storage medium, and is built into the client terminal 100 or is externally attached. The drive 909 reads out information recorded in a removable recording medium, such as a mounted magnetic disk, an optical disk, a magneto-optical disk, or a semiconductor memory, and outputs the information to the RAM 903.

The connection port 911 is an interface connected to an external apparatus, and is a connection port with the external apparatus that can transmit data by USB (Universal Serial Bus) or the like, for example. Further, the communications apparatus 913, for example, is a communications interface configured by a communications device or the like for connecting to a communications network 5. Further, the communications apparatus 913 may be a communications apparatus for wireless LAN (Local Area Network), a communications apparatus for a wireless USB, or a wired communications apparatus which communicates by cables.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing embodiment, the action log display system including the client terminal 100, the log server 200, and the analysis server 300 has been described, but the present technology is not limited to this example. For example, one information processing terminal 500 having the functions of the client terminal 100, the log server 200, and the analysis server 300 may realize the function of the above-described action log display system. As the information processing terminal 500, for example, a terminal or the like held and used by the user is assumed.

Figure 33:
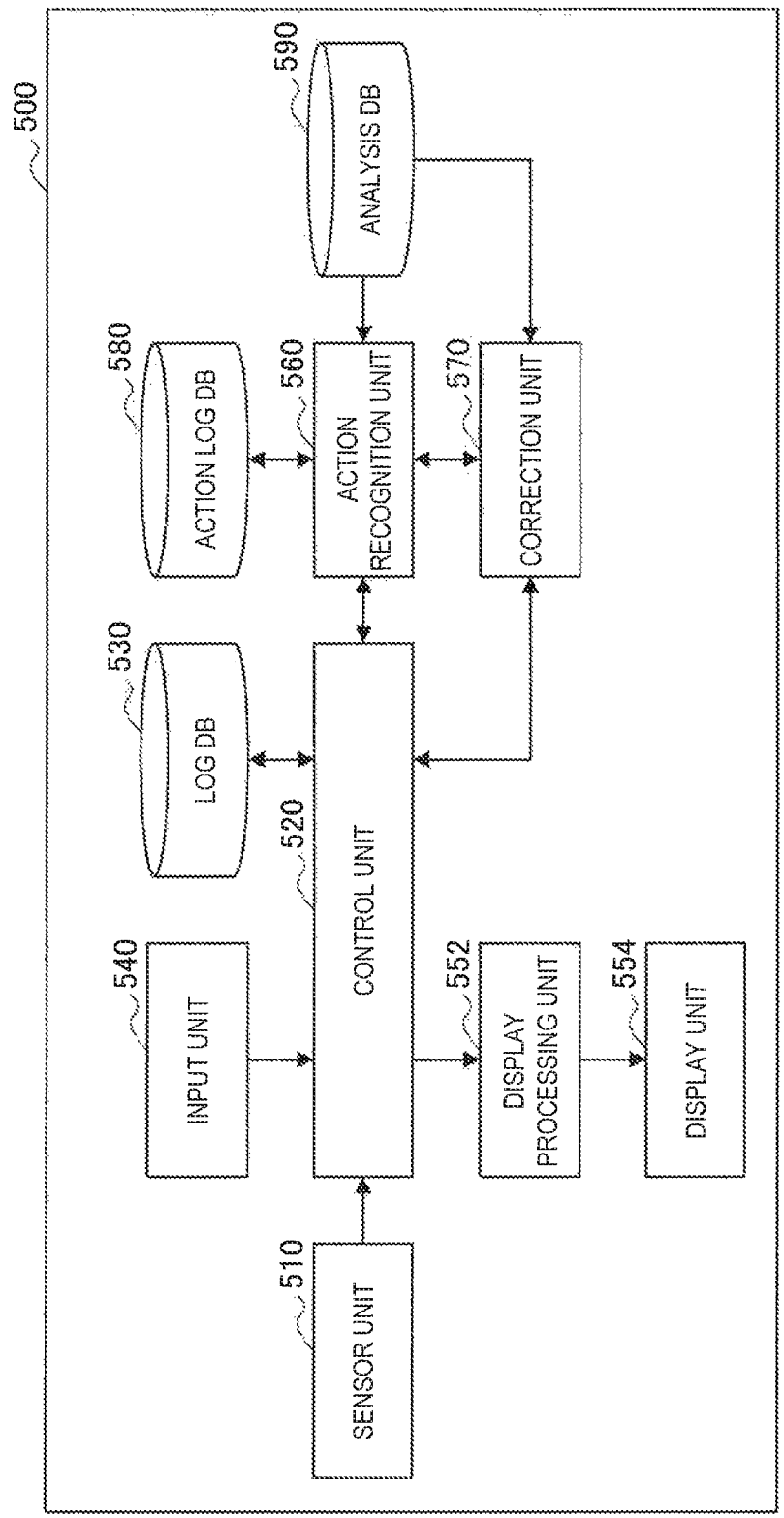
FIG. 33 is a block diagram illustrating an example of an information processing terminal that has functions of an action log display system.

For example, as illustrated in FIG. 33, the information processing terminal 500 includes a sensor unit 510, a control unit 520, a log DB 530, an input unit 540, a display processing unit 552, a display unit 554, an action recognition unit 560, a correction unit 570, an action log DB 580, and an analysis DB 590. The sensor unit 510, the input unit 540, the display processing unit 552, and the display unit 554 function as the above-described client terminal 100, and the log DB 530 functions as the above-described log server 200. The action recognition unit 560, the correction unit 570, the action log DB 580, and the analysis DB 590 function as the above-described analysis server 300, and the control unit 520 realizes the functions of the control units of the client terminal 100, the log server 200, and the analysis server 300.

The functions of the client terminal 100, the log server 200, and the analysis server 300 can be combined in one terminal, as illustrated in FIG. 33, and can also be realized by an appropriate terminal or server according to the configuration of the system.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
An information processing device including:
an action recognition unit configured to recognize an action of a user based on sensor information;
a speed acquisition unit configured to acquire speed information indicating a movement speed of the user, and
a correction unit configured to correct an action recognition result based on a comparison result between the speed information and a speed threshold set according to the action recognition result.

(2)
The information processing device according to (1),
wherein the speed acquisition unit calculates the speed information based on positional information of the user.

(3)
The information processing device according to (2),
wherein the speed acquisition unit acquires the speed information excluding the positional information when an accuracy value indicating accuracy of the positional information is equal to or greater than a predetermined value.

(4)
The information processing device according to (2) or (3),
wherein, when the speed information is equal to or greater than a predetermined value, the correction unit corrects the action recognition result by excluding positional information of a terminal point of a section of which the speed information has been calculated.

(5)
The information processing device according to any one of (2) to (4),
wherein the correction unit corrects the action recognition result by excluding positional information of a point other than an initial point and a terminal point of a still section when the point is determined to be still for a predetermined time or more within a predetermined range.

(6)
The information processing device according to (5),
wherein the correction unit changes positional information of the terminal point of the still section into positional information of the initial point.

(7)
The information processing device according to (5) or (6),
wherein, when a middle point in three temporally successive pieces of positional information is located outside a region of a circle concentric with a circle having a line connecting the initial point to the terminal point as a diameter, the correction unit corrects the action recognition result by excluding positional information of the middle point.

(8)
The information processing device according to any one of (1) to (7),
wherein the correction unit calculates an average speed in an action segment recognized as a section in which an identical action is executed based on the speed information, and corrects the action recognition result when the average speed is equal to or greater than a speed threshold.

(9)
An information processing method including:
recognizing an action of a user based on sensor information;
acquiring speed information indicating a movement speed of the user; and
correcting an action recognition result based on a comparison result between the speed information and a speed threshold set according to the action recognition result.

REFERENCE SIGNS LIST 100 client terminal
110 sensor unit
120 control unit
130 communication unit
140 input unit
150 display processing unit
160 display unit
200 log server
210 communication unit
220 control unit
230 log DB
300 analysis server
310 communication unit
320 control unit
330 action recognition unit
340 correction unit
342 feature vector generation unit
344 personalized learning unit
346 merging unit
350 action log DB
360 analysis DB
400 action log display screen
410 action display region
412 time axis
414 action recognition result object
420 summary region
430 process selection screen
440 action correction screen
500 information processing terminal

The invention claimed is:

1. An information processing device comprising:
an action recognition unit configured to recognize each action of a plurality of actions of a user based on sensor information;
a speed acquisition unit configured to acquire speed information indicating a movement speed during each recognized action of the user;
a display unit configured to display a plurality of action recognition result objects, each displayed action recognition result object being associated with a recognized action of the plurality of actions of the user; and
a correction unit configured to correct an action recognition result for an initially recognized action, when correction is needed based on a comparison result between the speed information for the initially recognized action and a speed threshold set according to the initially recognized action, to obtain a recognized final action,
wherein the displayed action recognition result object associated with each recognized final action corresponds to a time position of a time axis at which the recognized final action is performed, wherein the plurality of action recognition result objects are displayed with a change in action recognition result object at each time position of the time axis at which one recognized final action ends and another recognized final action starts, wherein the correction unit corrects the action recognition result by excluding positional information of a point other than an initial point and a terminal point of a still section when the point is determined to be still for a predetermined time or more within a predetermined range, and wherein the action recognition unit, the speed acquisition unit, the display unit, and the correction unit are each implemented via at least one processor.

2. The information processing device according to claim 1, wherein the speed acquisition unit calculates the speed information based on positional information of the user.

3. The information processing device according to claim 2, wherein the speed acquisition unit acquires the speed information excluding the positional information when an accuracy value indicating accuracy of the positional information is equal to or greater than a predetermined value.

4. The information processing device according to claim 2, wherein, when the speed information is equal to or greater than a predetermined value, the correction unit corrects the action recognition result by excluding positional information of a terminal point of a section of which the speed information has been calculated.

5. The information processing device according to claim 1, wherein the correction unit changes positional information of the terminal point of the still section into positional information of the initial point.

6. The information processing device according to claim 1, wherein, when a middle point in three temporally successive pieces of positional information is located outside a region of a circle concentric with a circle having a line connecting the initial point to the terminal point as a diameter, the correction unit corrects the action recognition result by excluding positional information of the middle point.

7. The information processing device according to claim 1, wherein the correction unit calculates an average speed in an action segment of the time axis recognized as a section throughout which an identical action is executed based on the speed information, and corrects the action recognition result when the average speed is equal to or greater than the speed threshold set according to the identical action.

8. The information processing device according to claim 1, wherein the correction unit corrects the action recognition result according to an input of the user.

9. An information processing method, implemented via at least one processor, the method comprising:

recognizing each action of a plurality of actions of a user based on sensor information;

acquiring speed information indicating a movement speed during each recognized action of the user;

displaying a plurality of action recognition result objects, each displayed action recognition result object being associated with a recognized action of the plurality of actions of the user; and correcting an action recognition result for an initially recognized action, when correction is needed based on a comparison result between the speed information for the initially recognized action and a speed threshold set according to the initially recognized action, recognition result if correction to the action recognition result is needed to obtain a recognized final action, wherein the displayed action recognition result object associated with each recognized final action corresponds to a time position of a time axis at which the recognized final action is performed, wherein the plurality of action recognition result objects are displayed with a change in action recognition result object at each time position of the time axis at which one recognized final action ends and another recognized final action starts, and wherein the action recognition result is corrected by excluding positional information of a point other than an initial point and a terminal point of a still section when the point is determined to be still for a predetermined time or more within a predetermined range.

10. A non-transitory computer-readable medium having embodied thereon a program, which when executed by a computer causes the computer to execute a method, the method comprising:

recognizing each action of a plurality of actions of a user based on sensor information;

acquiring speed information indicating a movement speed during each recognized action of the user;

displaying a plurality of action recognition result objects, each displayed action recognition result object being associated with a recognized action of the plurality of actions of the user; and correcting an action recognition result for an initially recognized action, when correction is needed based on a comparison result between the speed information for the initially recognized action and a speed threshold set according to the initially recognized action, recognition result if correction to the action recognition result is needed to obtain a final action recognition;

wherein the displayed action recognition result object associated with each recognized final action corresponds to a time position of a time axis at which the recognized final action is performed, wherein the plurality of action recognition result objects are displayed with a change in action recognition result object at each time position of the time axis at which one recognized final action ends and another recognized final action starts, and wherein the action recognition result is corrected by excluding positional information of a point other than an initial point and a terminal point of a still section when the point is determined to be still for a predetermined time or more within a predetermined range.

* * * * *